United States Patent [19]

Chainer et al.

[11] Patent Number: 5,615,058
[45] Date of Patent: Mar. 25, 1997

[54] METHOD AND SYSTEM FOR WRITING A SERVO-PATTERN ON A STORAGE MEDIUM

[75] Inventors: Timothy J. Chainer, Mahopac, N.Y.; Wayne J. Sohn, Modiin, Israel; Edward J. Yarmchuk, Somers, N.Y.

[73] Assignee: International Business Machines Corporation, Armonk, N.Y.

[21] Appl. No.: 371,463

[22] Filed: Jan. 11, 1995

Related U.S. Application Data

[63] Continuation of Ser. No. 28,044, Mar. 8, 1993, abandoned.

[51] Int. Cl.⁶ ................................................. G11B 27/28
[52] U.S. Cl. ............................ 360/51; 360/75; 360/77.08
[58] Field of Search ................................ 360/72.05, 51, 360/75, 77.02, 77.07, 77.08

[56] References Cited

U.S. PATENT DOCUMENTS

| | | | |
|---|---|---|---|
| 4,414,589 | 11/1983 | Oliver et al. | 360/77.07 |
| 4,530,019 | 7/1985 | Penniman | 360/77.08 |
| 4,531,167 | 7/1985 | Berger | 360/77.02 |
| 4,586,094 | 4/1986 | Chambors et al. | 360/77.12 |
| 4,642,709 | 2/1987 | Vinal | 360/77.05 |
| 4,729,048 | 3/1988 | Imakoshi et al. | 360/103 |
| 5,416,652 | 5/1995 | Lewis | 360/48 |

OTHER PUBLICATIONS

E. C. Nassimbene "High Track Density Floppy Disk File", Aug. 1983, IBM Tech. Disc. Bulletin vol. 26 No. 3A pp 1275–1276.

Fowler et al. "Regenerative Clock Technique for Serv. Track Writers", Oct. 1990, IBM Technical Disclosure Bulletin vol. 33 No. 5 pp. 310–311.

Primary Examiner—Aristotelis Psitos
Assistant Examiner—Ames T. Wilson
Attorney, Agent, or Firm—Heslin & Rothenberg, P.C.

[57] ABSTRACT

A technique for writing a servo-pattern on a storage medium located in a recording device having an internal recording head. A timing pattern is generated on the storage medium with the internal recording head and a radial positioning value is determined in order to radially position the internal recording head. The servo-pattern is written using the internal recording head at locations determined by the timing pattern and the radial positioning value.

32 Claims, 15 Drawing Sheets

F=0

F=1

F=0.5

METHOD AND SYSTEM FOR WRITING A SERVO-PATTERN ON A STORAGE MEDIUM

This application is a continuation, of application Ser. No. 08/028,044, filed Mar. 8, 1993 now abandoned.

TECHNICAL FIELD

This invention relates in general to recording devices and, in particular, to writing servo-patterns on storage media without using external sensors.

BACKGROUND ART

Information for systems, such as data processing systems is typically stored on storage media, such as magnetic disks. In manufacturing disks, a disk drive having a number of internal heads is typically mounted in a mastering station referred to as a servo-writer. The servo-writer has sensors positioned outside of the disk drive to locate the radial and circumferential position of at least one of the heads, such that a pattern of magnetic information may be written onto the disk surface coupled to the writing head. The pattern becomes the master reference used by the disk drive during normal operation to locate the tracks and sectors for data storage.

The process of servo writing on a station is expensive as each disk drive must be serially mounted in the servo-writer. In addition, the mechanical boundary conditions of the disk are altered as sensors must have access to the actuator and the disk spindle motor. This can require mechanical clamping and disassembly of the file.

One process for writing servo information is described in U.S. Pat. No. 4,414,589, entitled "Embedded Servo Track Following System and Method for Writing Servo Tracks" issued on Nov. 8, 1983 and assigned to Northern Telecom, Inc. In U.S. Pat. No. 4,414,589, a servo track following system for positioning a moving read/write head relative to a magnetic storage disk is described. A plurality of servo tracks are recorded in sectors on the disk for identifying radial positions or informational tracks. A clock track is written by writing a single pulse on a fixed clock track head, phase-lock looping to an intermediate clock track, which is written on a moving head, and then phase-lock looping up to the final clock track, which is written on the fixed clock track head. Radial track density is then determined by moving a head to a limit stop and writing a reference track. Thereafter, the head is displaced an amount sufficient to reduce the amplitude of the reference track by a predetermined percentage which is related to the ultimate average track density. Thereafter, another reference track is written and the head is again stepped away from the second reference track an amount sufficient to again reduce the amplitude of the reference track by a predetermined percentage. This is continued until the disk is filled with reference tracks. If the average track density thus achieved is unsatisfactory, the reduction number is adjusted and the process is repeated.

Another technique for writing servo information is described in U.S. Pat. No. 4,531,167, entitled "Servowriter System for Magnetic Disk Drives" issued on Jul. 23, 1985 and assigned to Pioneer Research, Inc. In U.S. Pat. No. 4,531,167, before servo tracks are written on a disk, it is first necessary to write a master clock track on the disk by a separate head, which serves as a timing reference for the entire operation. Servo bursts are then written on the disk by writing EVEN servo information over the entire surface of the disk. This is achieved by first moving the arm to the outer crash stop and then causing the arm to move radially a distance less than a data track width for each revolution of the disk. Thereafter, the arm is again driven against the outer crash stop and the head is caused to write ODD servo information in a number of sectors of the disk drive. After the arm used in writing the ODD servo information reaches the inner diameter of the disk, a comparison of the number of steps it takes the arm to proceed from the outer crash stop to the inner crash stop is made with the number of tracks actually required on the disk. If the number of actual steps is different from the number of tracks actually required, a particular bias, of an amount determined by the microprocessor, will be introduced so that on the next operation the number of steps will exactly equal the number of tracks required on the disk.

Each of the above procedures requires an external timing sensor in order to write timing patterns used in determining the circumferential position of the heads. Further, since external sensors are needed, a clean room environment is necessary. In addition, in order to determine the track pitch which is later used to write a servo-pattern, an entire disk of information is written. This is time consuming and expensive. Therefore, a need exists for a technique for writing servo-patterns on a disk which does not require a clean room environment. In addition, a need exists for a technique for writing servo-patterns such that no external sensors are needed. Yet another need exists for a method for determining which head writes the widest track in a recording device. Also, a need exists for a method for determining the track pitch of a recording device without writing a full disk of information. Further, a need exists for a technique for writing timing information in which an external clock source is eliminated, thus reducing the possibility of error arising from relative motion between the head that is writing the servo-pattern and the clock source.

DISCLOSURE OF THE INVENTION

The shortcomings of the prior art are overcome and additional advantages are provided through the provision of a method for writing a servo-pattern on a storage medium located in a recording device having an internal recording head. A timing pattern is generated on the storage medium with the internal recording head and a radial positioning value used in radially positioning the internal recording head is determined. The servo-pattern is written at the locations determined by the generated timing pattern and radial positioning value.

In one embodiment, in order to generate the timing pattern on a storage medium having a plurality of tracks, a plurality of transitions is written on a first of the plurality of tracks, a time interval between each pair of the plurality of transitions is determined, an amount of deviation between each determined time interval and a predetermined nominal interval is determined and a plurality of transitions is written on a second of the plurality of tracks. A first portion of the plurality of transitions is written at a first predetermined timed delay and a second portion of the plurality of transitions is written at a second predetermined time delay.

In a further embodiment, the track pitch of a recording device having a storage medium of N tracks is determined. A transition is written on some of the plurality of N tracks, a read-back signal associated with each written transition is obtained, and the read-back signals are compared in order to determine the track pitch.

In yet another embodiment, a determination is made as to which of a plurality of recording heads in a recording device writes the widest. A first transition is written with each of the plurality of recording heads and a second transition is written with one of the plurality of recording heads. The second transition is written at a predetermined distance from the first transition written with the same recording head as the second transition. Each of the recording heads is positioned using the second transition and an amplitude signal associated with each of the first transitions is read and compared with the positioned recording heads. From the comparison, the recording head which writes the widest is determined.

In another embodiment, a timing pattern is generated on one of a plurality of storage media located in a recording device having a plurality of internal recording heads. Each of the plurality of storage media has at least one of the plurality of internal recording heads associated therewith. A first plurality of transitions representative of a timing pattern is written with a first of the plurality of internal recording heads. The first and second of the plurality of internal recording heads is positioned. The first plurality of transitions is read with the first positioned recording head and a second plurality of transitions is written with the second positioned head. The first and second recording heads are repositioned and the second plurality of transitions is read with the repositioned second recording head and a third plurality of transitions is written with the repositioned first recording head.

In a further aspect of the invention, a system for writing a servo-pattern on a storage medium located in a recording device is provided. The system includes means for generating a timing pattern on the storage medium with the internal recording head, means for determining a radial positioning value used for radially positioning the internal recording head, and means for writing a servo-pattern on the storage medium with the internal recording head. The servo-pattern is written at locations determined by the timing pattern and the radial positioning value.

In another aspect of the invention, a recording device is provided. The recording device includes a storage medium located within the recording device and an internal recording head within the recording device for writing timing information and servo-patterns on the storage medium. In one embodiment, the recording device is sealed.

The technique of the present invention enables servo-patterns to be written on a storage media without the need for external sensors or a clean room environment. In addition, a technique is provided for determining the track pitch of a recording device without requiring the writing of a full disk of information. Further, a timing pattern is written without the need for an external clock source. The techniques of the present invention enables timing information and servo-patterns to be written easily and more accurately than before.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1A:
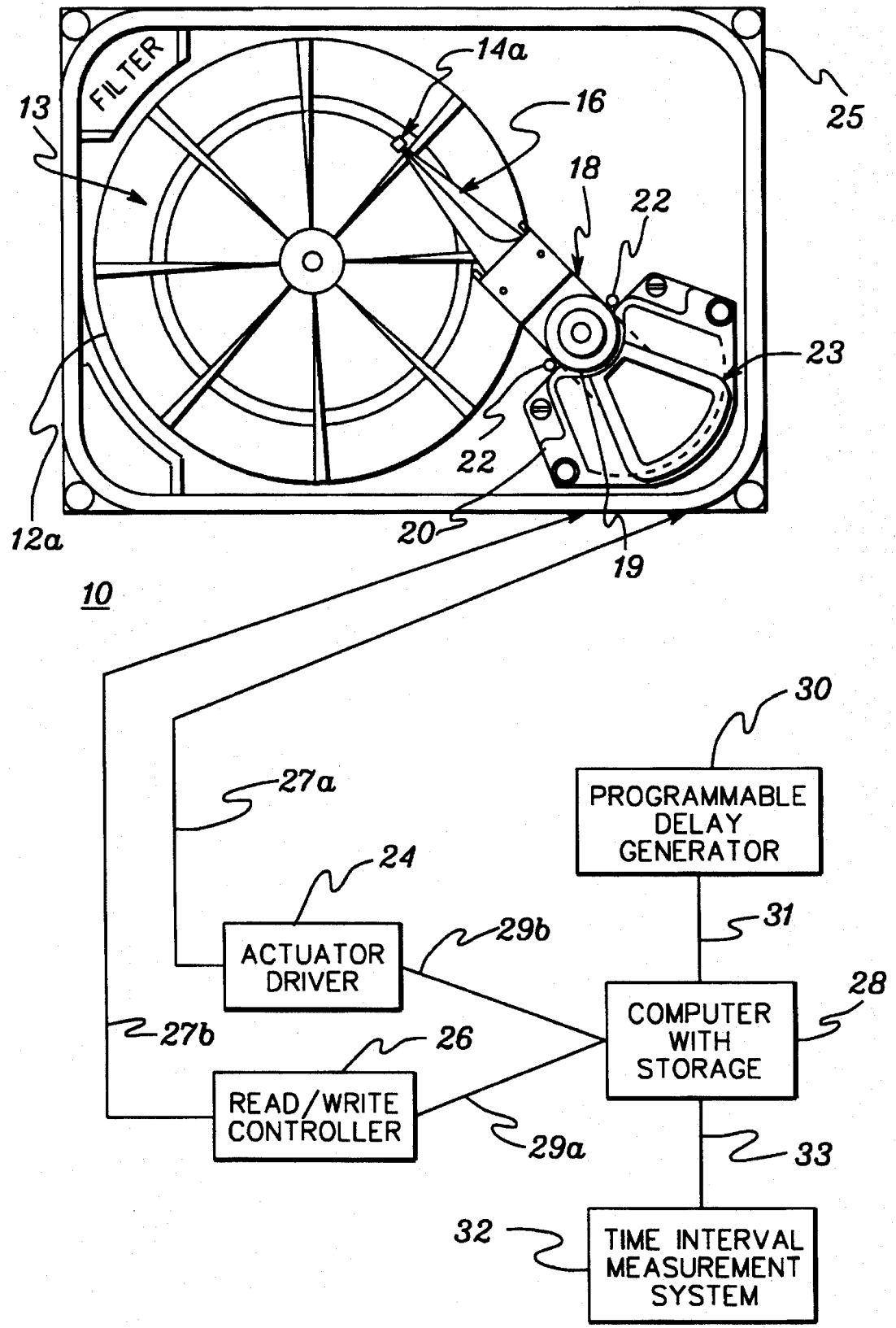
FIG. 1a depicts one example of a disk drive incorporating the servo-pattern writing technique of the present invention.
Figure 1B:
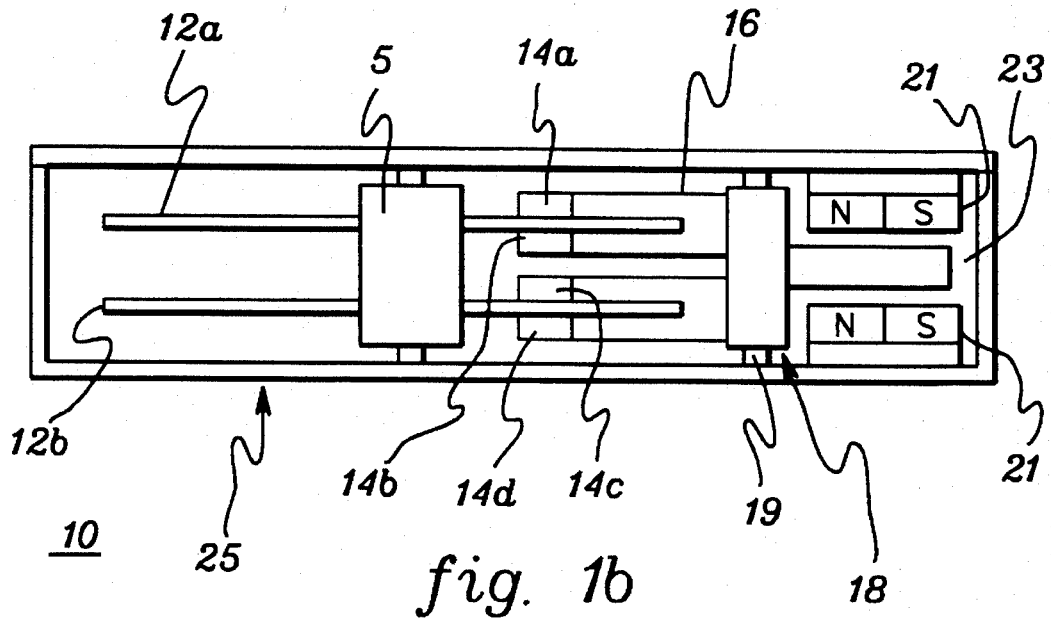
FIG. 1b depicts one example of a side view of a disk drive having a plurality of recording disks, in accordance with the principles of the present invention.

In accordance with the principles of the present invention, a method and apparatus for writing a servo-pattern on a storage medium is provided. In one embodiment, a servo-pattern is written on one or more magnetic disks located in a recording device, such as a disk drive. Referring to FIGS. 1a and 1b, in one example, a disk drive 10 includes one or more magnetic disks 12a–12b (collectively referred to as magnetic disks 12), one or more internal recording heads 14a–14d (collectively referred to as recording heads 14), a suspension mechanism 16, an actuator 18, an actuator attachment 20, one or more crash stops 22, an actuator driver 24, a read/write controller 26, a computer 28, a programmable delay generator 30 and a time interval measurement system 32. Each of these components is described in detail below.

Each magnetic disk has, for instance, two surfaces which are capable of receiving information and each surface has a plurality of tracks 13. In accordance with the principles of the present invention, information, such as timing information and servo-patterns, are written on the surfaces of one or more of magnetic disks 12 by using internal recording heads 14. A spindle motor 5 (FIG. 1b) is located in the inner diameter of disks 12 and is used, as is known in the art, to spin magnetic disks 12. As depicted in FIG. 1a, recording heads 14 are attached to suspension mechanism 16.

Suspension mechanism 16 allows the recording heads to move in a vertical direction and is connected to actuator 18. Actuator 18 is, for example, a standard moving coil actuator which includes a ball bearing 19 connected to a voice coil motor 23. As shown in FIG. 1b, motor 23 includes one or more magnets 21. On each side of ball bearing 19 is a crash stop 22 which is used to limit the motion range of the actuator. Actuator 18 is mounted to a base plate 25 via actuator attachment 20. In one example, actuator attachment 20 attaches the actuator to the base plate via one or more screws.

Actuator driver 24, which is coupled to base plate 25 via a wire 27a, includes electronic circuits, such as power transistors, for providing current to voice coil motor 23.

Also coupled to base plate 25 via a wire 27b is read/write controller 26, which is used for reading and writing magnetic transitions on the disks, as described below in accordance with the principles of the present invention.

Coupled to read/write controller 26 and actuator driver 24 via buses 29a and 29b, respectively, is computer 28. Computer 28 includes, for instance, a standard personal computer which has storage for saving information.

Coupled to computer 28 via an IEEE bus 31 is programmable delay generator 30. Programmable delay generator 30 is, for instance, a Hewlett Packard HP8118A and is used to control the time at which a given transition is written, as described in further detail below.

Also coupled to computer 28 via an IEEE bus 33 is time interval measurement system 32 which is used, in accordance with the principles of the present invention, to measure required time intervals. In one embodiment, time interval measurement system 32 includes an HP5372A time analyzer offered by Hewlett Packard.

It will be apparent to one of ordinary skill in the art that there may be many variations to the disk drive depicted in FIGS. 1a and 1b. For instance, a disk drive may have only one magnetic disk or only one recording head.

In accordance with the principles of the present invention, disk drive 10 is used to write a servo-pattern on one or more of magnetic disks 12. The servo-pattern is written at specific locations on one or more disk surfaces and, therefore, before the servo-pattern is written, radial positioning information and circumferential positioning information (θ) is determined for the recording head used in writing the servo-pattern. One example of a technique used in writing servo-patterns is described in detail below.

Figure 2:
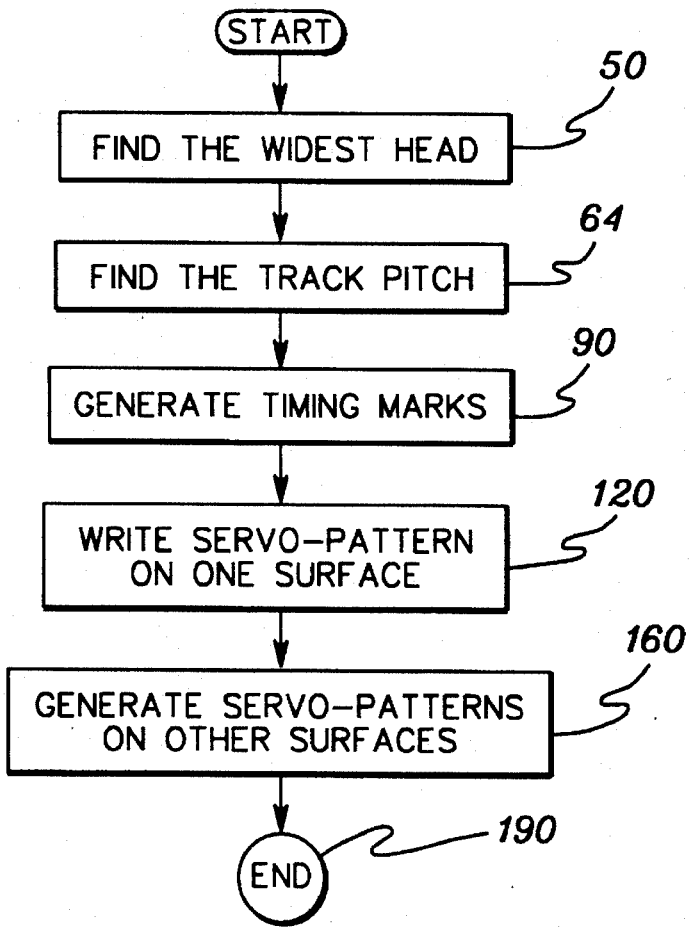
FIG. 2 depicts one example of the logic associated with the servo-pattern writing technique of the present invention.

Referring to FIG. 2, in one embodiment, a determination is made as to which recording head of disk drive 10 writes the widest track, STEP 50 "FIND THE WIDEST HEAD." In this embodiment, the head that writes the widest track is the desired head used for writing the timing pattern and the servo-pattern, as described in detail below. If there is only one recording head, then that head is the one that writes the widest track. The manner in which the widest head is determined is described in detail with reference to FIG. 3.

Figure 3:
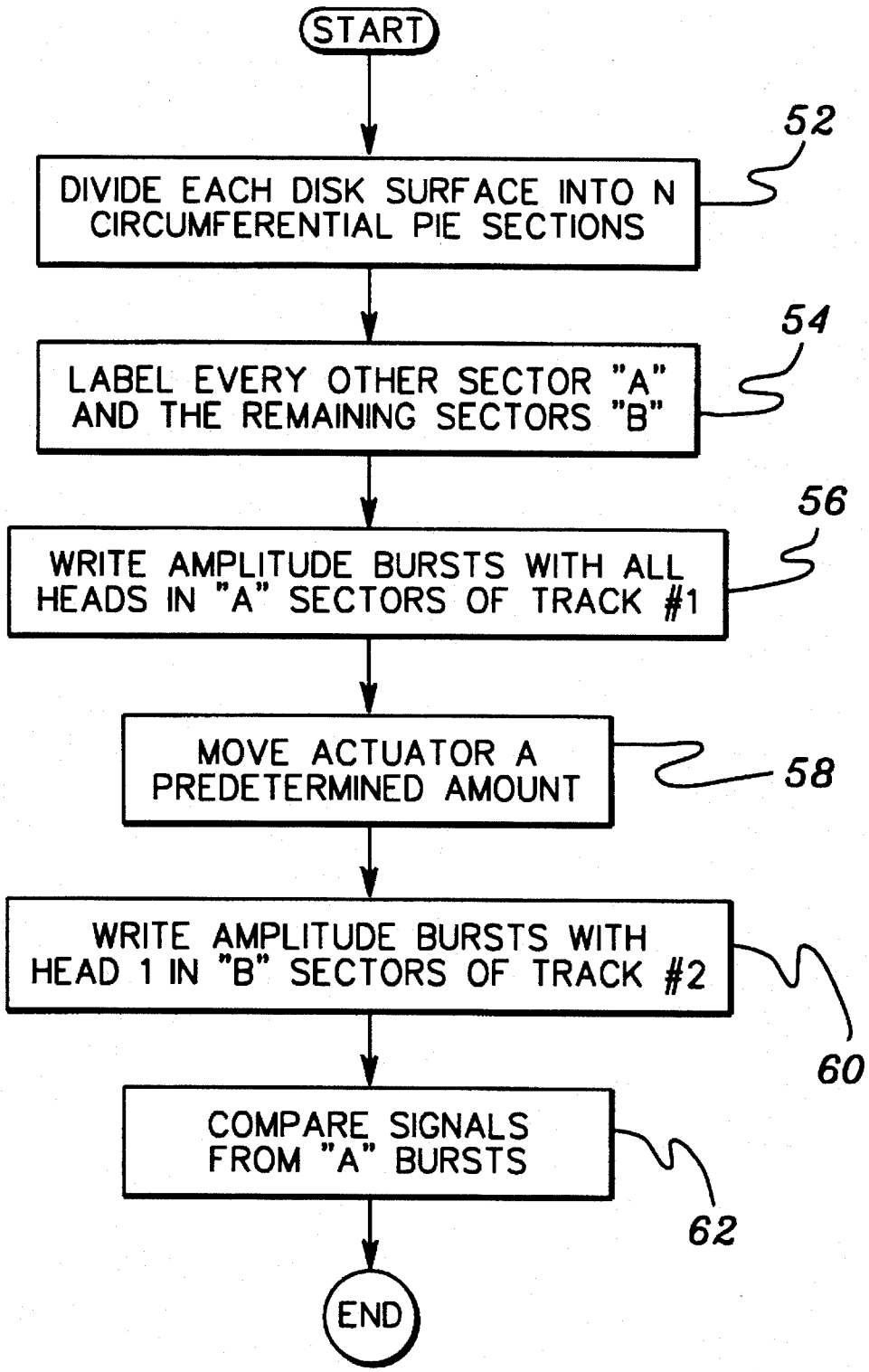
FIG. 3 depicts one example of the logic associated with a technique for determining the head which writes the widest track, in accordance with the principles of the present invention.
Figure 4:
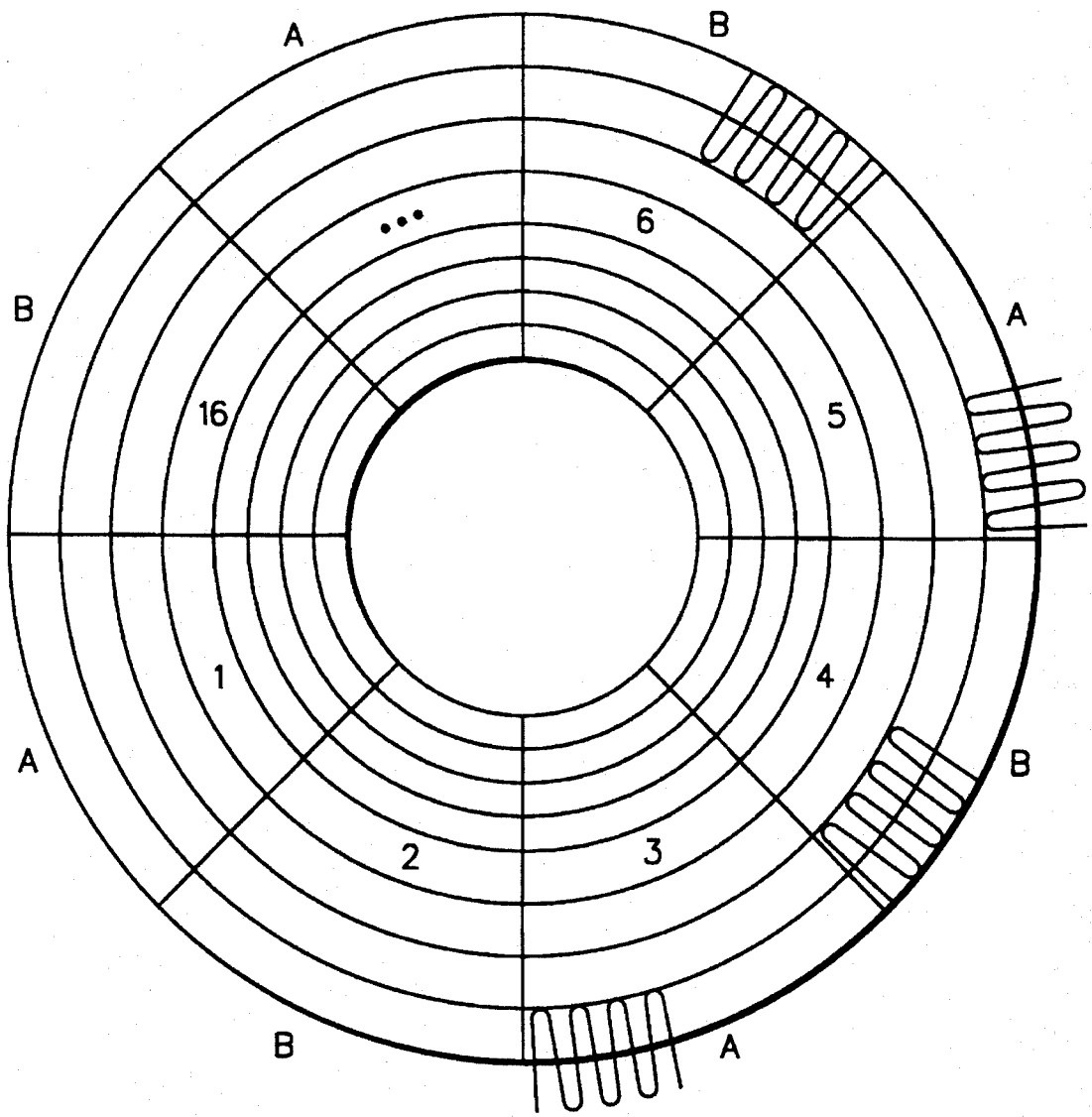
FIG. 4 illustrates one embodiment of a disk surface divided into N circumferential pie sections, in accordance with the principles of the present invention.

Referring to FIG. 3, in accordance with the principles of the present invention, in order to determine which of the recording heads of a disk drive or other recording device writes the widest track, each of the disk surfaces located within the disk drive are divided into a number, N, circumferential pie sections, STEP 52 "DIVIDE EACH DISK SURFACE INTO N CIRCUMFERENTIAL PIE SECTIONS." In one example, N is set equal to sixteen and, therefore, the disk surface is divided into sixteen circumferential pie sections as shown in FIG. 4. As is known in the art, in order to divide a disk surface, an index is used to identify the first sector. Thereafter, any number of sectors can be defined by writing patterns at a predetermined distance apart from one another.

Referring to FIGS. 3 and 4, subsequent to dividing each surface into N sectors, every other sector is labeled the A sector and the remaining sectors are labeled B sectors, STEP 54 "LABEL EVERY OTHER SECTOR "A" AND THE REMAINING SECTORS "B"." Thereafter, while holding actuator 18 against crash stop 22, each recording head 14 is used to write amplitude bursts (i.e., one or more magnetic transitions) on a respective disk surface. In particular, in accordance with the principles of the present invention, amplitude bursts are written in each of the "A" sectors of the first track of a disk surface, STEP 56 "WRITE AMPLITUDE BURSTS WITH ALL HEADS IN "A" SECTORS OF TRACK #1."

Figure 5:
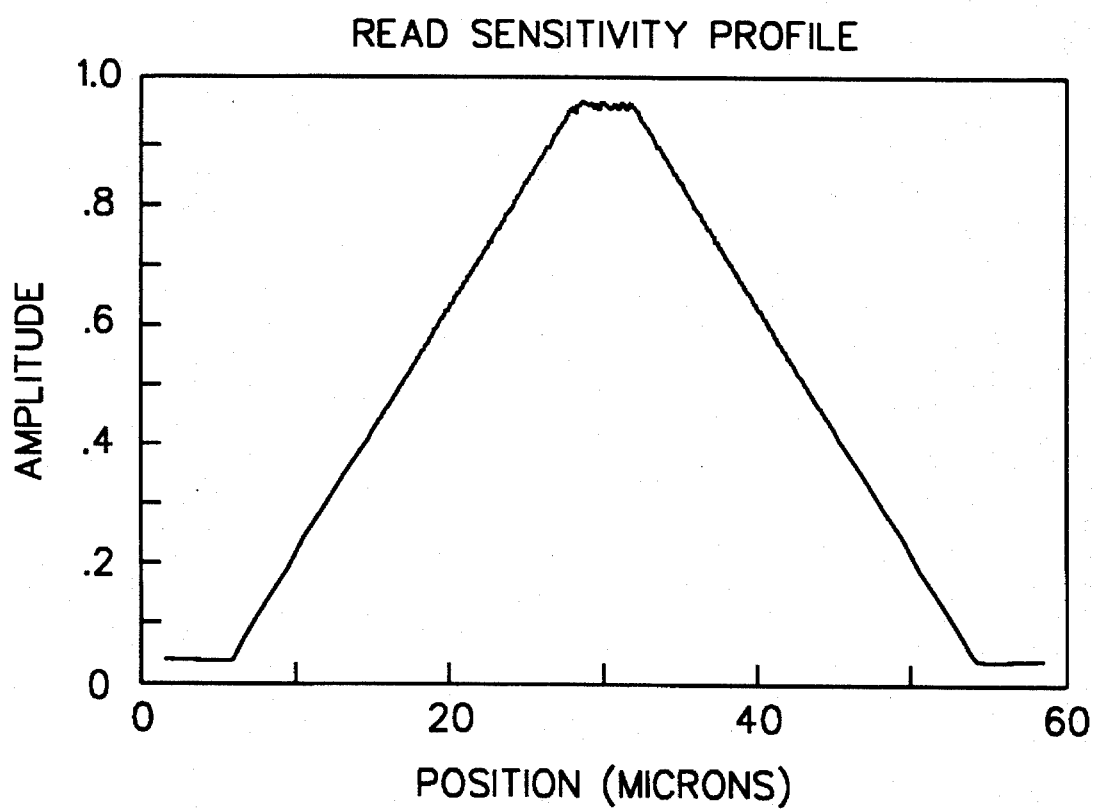
FIG. 5 depicts one example of a plot of signal amplitude versus off-track position of a recording head, in accordance with the principles of the present invention.

Subsequent to writing the bursts of information, actuator 18 is moved a predetermined distance, STEP 58 "MOVE ACTUATOR A PREDETERMINED AMOUNT." In one embodiment, the predetermined distance is based on the signal amplitude of the recording head, such as head 14a, versus the off-track position of the head. One example of the approximate linear relationship between amplitude and off-track position is depicted in FIG. 5. As shown in FIG. 5, when the amplitude is at its maximum value, the recording head is directly on the track (i.e., 30 microns) and when the recording head is at half its maximum amplitude (i.e., approximately 0.5), the recording head is approximately half off of the track (i.e., 15 microns). In one instance, the actuator is moved until the read-back signal from head 14a is equal to half of its maximum amplitude (i.e., half off the track). While servoing at the half amplitude position which is accomplished by sampling the rectified head signal, amplitude bursts are written with head 14a in the B sectors on the second track of the disk surface corresponding to head 14a, STEP 60 "WRITE AMPLITUDE BURSTS WITH HEAD 1 IN "B" SECTORS OF TRACK #2."

By moving radially off of the second track, the "B" bursts can be used to provide position information. For instance, the head can be gated to read the signal from the magnetic transitions corresponding to the "B" bursts during specific intervals (amplitude bursts). Using a sample and hold circuit, the voltage corresponding to the amplitude of the read-back signal is held constant in the intervals between bursts. This makes a suitable position signal input to the servo-loop to position the actuator. In one embodiment, when servoing to a given amplitude of the read-back signal, a servo-control loop with a low bandwidth is used. Then, the head position is an average of all the sector bursts, rather than following the repeatable variations of the magnetic servo-signal. Using the amplitude of the "B" burst as the position signal for the servo system (i.e., servo-on), the amplitude signals from the "A" bursts under all of the recording heads of the disk drive are read and compared, STEP 62 "COMPARE SIGNALS FROM "A" BURSTS." In one example, the signals from the "A" bursts are read and compared using a standard measurement tool, such as a voltmeter or a digital oscilloscope. At the point where the signal is lost from all of the heads except one, that head is determined to be the one that writes/reads the widest track.

Although the example described above uses a plurality of "A" and "B" bursts, it is possible to use only one "A" burst and one "B" burst.

Referring to FIG. 2, in one embodiment, after the head that writes the widest track, hereinafter denoted head W, is determined, it is used in accordance with the principles of the present invention to determine the track pitch of the disk drive, STEP 64 "FIND THE TRACK PITCH."

Figure 6:
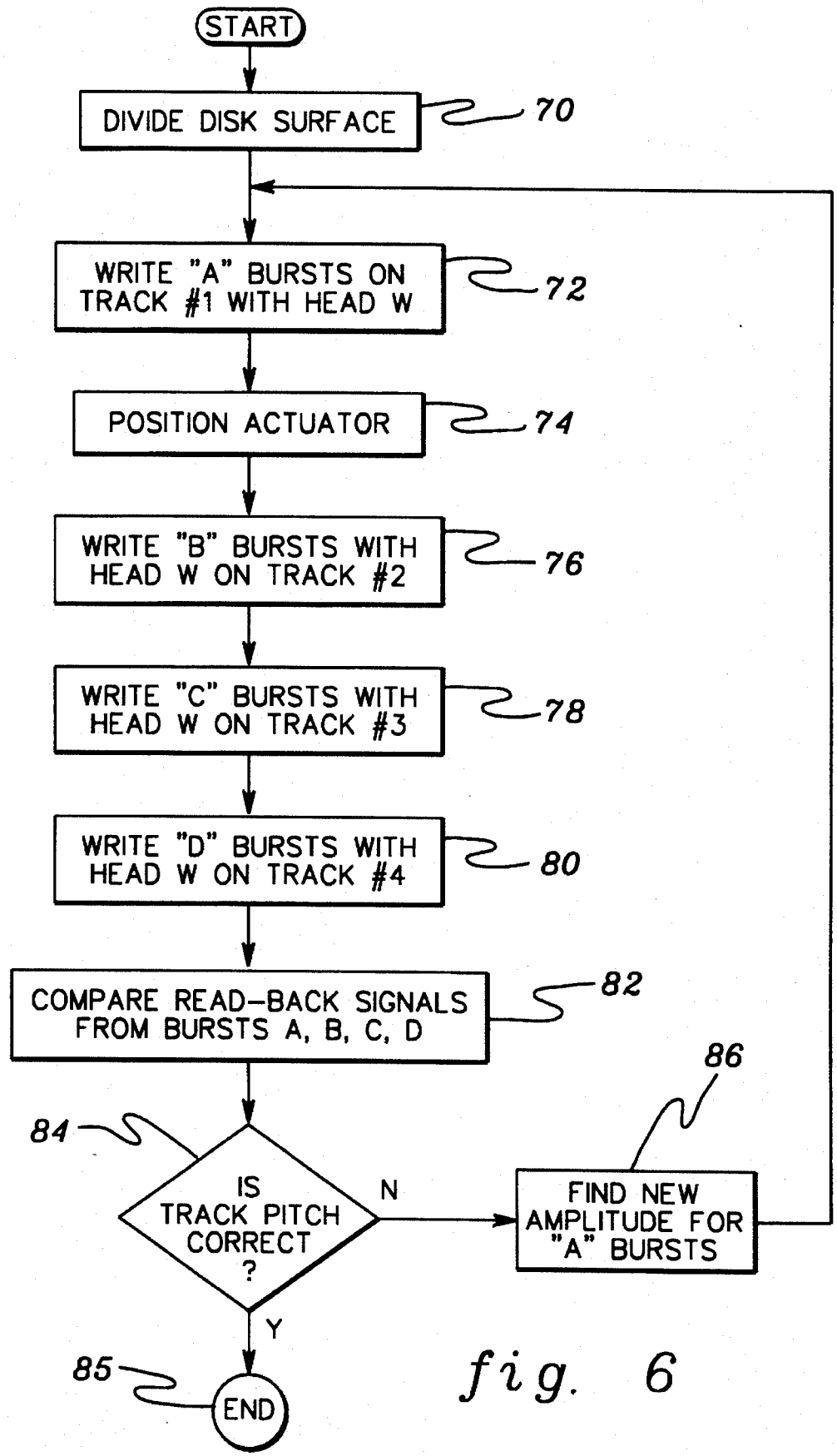
FIG. 6 depicts one embodiment of the logic associated with a technique for determining track pitch, in accordance with the principles of the present invention.
Figure 7:
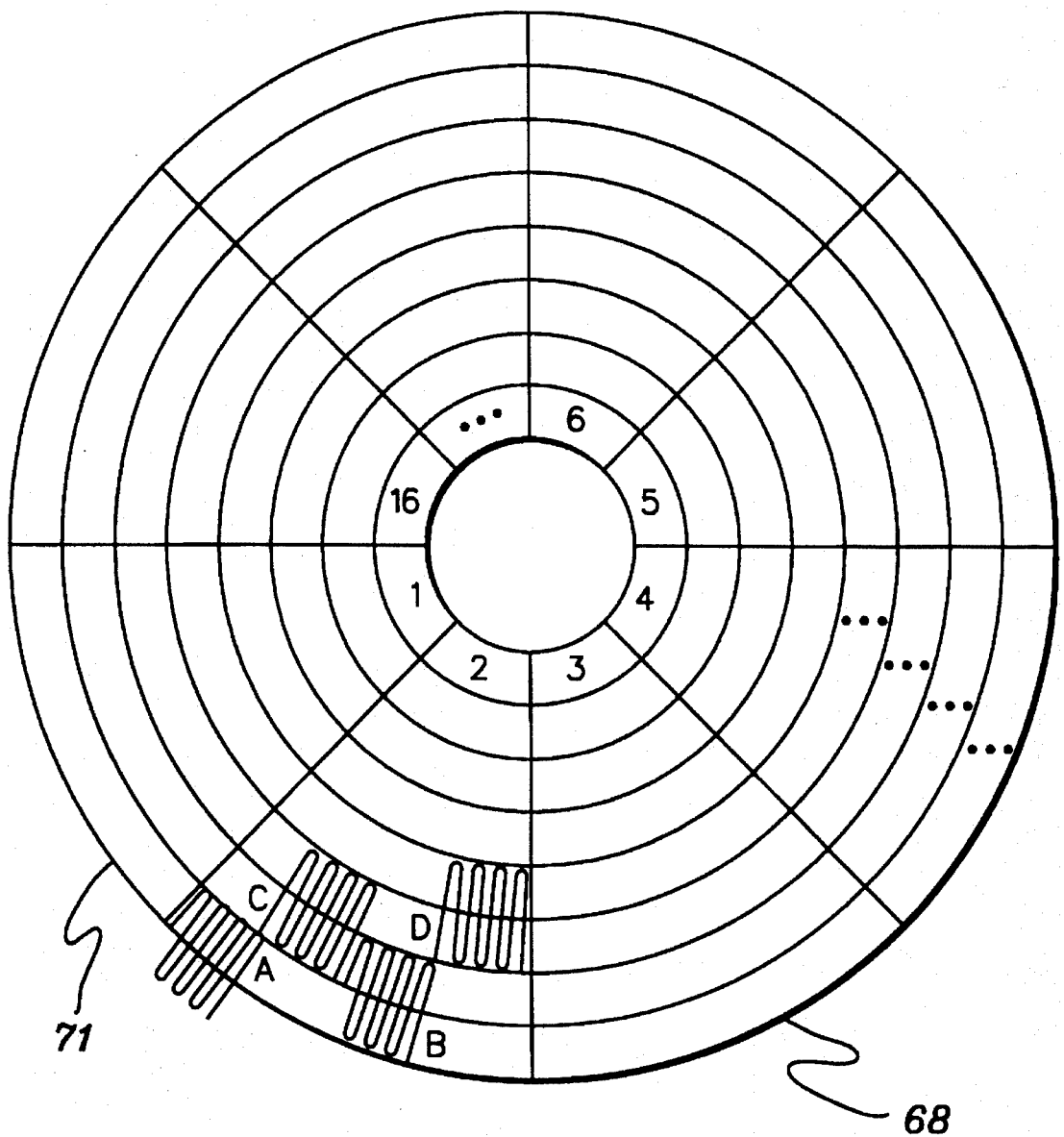
FIG. 7 illustrates one embodiment of a disk surface divided into N circumferential pie sections with four bursts written in one section, in accordance with the principles of the present invention.

Referring to FIGS. 6 and 7, in one embodiment, in order to determine the track pitch of the disk drive, the disk surface corresponding to head W is divided into a number, N, of circumferential pie sections, STEP 70 "DIVIDE DISK SURFACE". As shown in FIG. 7, in one example, the disk surface is divided into sixteen sections 68 and each section 68 has a plurality of tracks 71. Typically, a disk surface has a track density of approximately 4000 tracks per inch (i.e., 2000 data tracks wherein a data track is twice as wide as a track and one data track does not overlap another data track).

Referring again to FIG. 6, subsequent to dividing the disk surface, actuator 18 is held against the crash stop and amplitude bursts, referred to as "A" bursts, are written on the first track of each section with head W, STEP 72 "WRITE "A" BURSTS ON TRACK #1 WITH HEAD W" (see FIG. 7). (In another embodiment, it is possible to write the "A" bursts on the first track with a head other than the head that writes the widest track. In addition, it is possible to write the bursts on a track other than the first track.) Subsequent to writing the amplitude bursts, actuator 18 is moved a predetermined distance such that for instance, the amplitude from the head that writes the widest track is at half of the maximum amplitude or at an amplitude which is a best guess to provide proper spacing between tracks, STEP 74 "POSITION ACTUATOR."

Subsequent to positioning the actuator, the actuator is held at that position and "B" bursts are written on the second track of each section, STEP 76 "WRITE "B" BURSTS WITH HEAD W ON TRACK #2." Similarly, by servoing-on the "B" bursts, "C" bursts are written on the third track of each section, STEP 78 "WRITE "C" BURSTS WITH HEAD W ON TRACK #3" and by servoing-on the "C" bursts, "D" bursts are written on the fourth track of each section, STEP 80 "WRITE "D" BURSTS WITH HEAD W ON TRACK #4."

Figure 8:
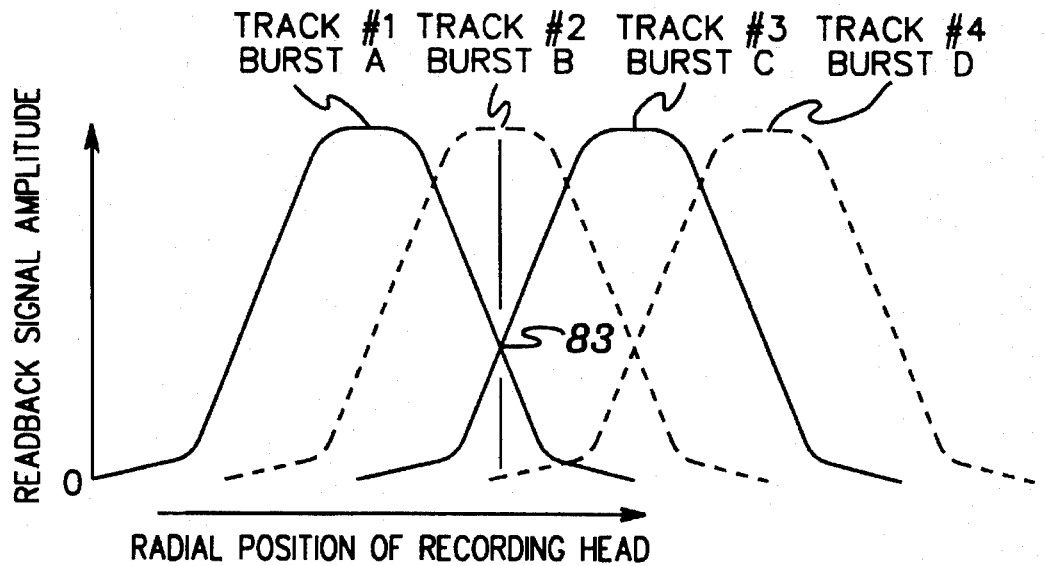
FIG. 8 depicts one example of a plot showing a read-back signal amplitude versus the radial position of a recording head in which a correct track pitch is present, in accordance with the principles of the present invention.

Subsequent to writing the four bursts (A,B,C, and D bursts) on the tracks with the head that writes the widest track, the track pitch can be determined by comparing the read-back signals from each of the bursts, STEP 82 "COMPARE READ-BACK SIGNALS FROM BURSTS A, B, C, D." If the track pitch is at a desired level, then when head W is centered over the second track, the read-back signal from the "B" burst is the maximum value and there is no amplitude signal from the fourth track. That is, if the track pitch is equal to the head width, then the amplitude from the "D" burst is below a threshold set to be near zero, such as −40dB below the on-track amplitude. Further, the signal from both the "A" and "C" bursts are equal to the amplitude which was servoed to when the second track was written. An example of the above is shown in FIG. 8 in which at reference numeral 83, the amplitude of the "B" burst is maximum, the amplitude of the "D" burst is near zero and the amplitude of bursts "A" and "C" are equal.

If the track pitch is correct, INQUIRY 84 "IS TRACK PITCH CORRECT?", then the process has ended and the value of the amplitude from burst "A" that was servoed to when burst "B" was written, referred to as Q1, is used, as described below, to write the servo-pattern, STEP 85 "END". However, if the read-back signals are as shown in FIG. 9, then the track pitch is too high and a new amplitude for the "A" bursts is determined, as described below, STEP 86 "FIND NEW AMPLITUDE FOR "A" BURSTS".

Figure 9:
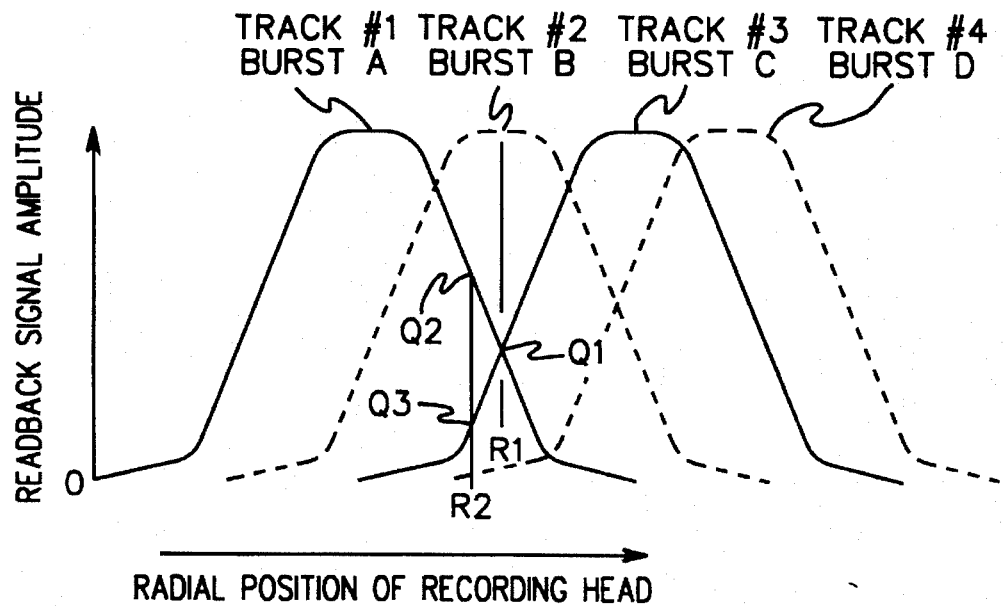
FIG. 9 depicts one example of a plot showing read-back signal amplitude versus the radial position of a recording head in which an incorrect track pitch is present, in accordance with the principles of the present invention.

In particular, referring to FIG. 9, Q1 denotes the amplitude from burst A that was servoed to when burst "B" was written. At that position (R1), the signal from burst "D" is still not near zero. By servoing to a new position, R2, where the signal from burst "A" is equal to Q2, the signal from burst "D" drops to a predefined threshold near zero. At this position, the signal from burst "C" is equal to Q3. Therefore, it follows that whenever the track pitch is too high, then Q2>Q1>Q3. Similarly, if the track pitch is too low, then Q2<Q1<Q3.

As mentioned above if the track pitch is incorrect, then a new amplitude, $Q1_{new}$, for the "A" bursts is determined. In one embodiment, in order to determine a new amplitude for the "A" burst, the following equation may be used, if the read-back signal is linear in the region where the amplitude is Q1:

$$Q1_{new} = \frac{1}{2}(Q3 + Q1_{old}).$$

Referring to FIG. 6, subsequent to finding $Q1_{new}$, flow passes to STEP 72 "WRITE "A" BURSTS ON TRACK #1 WITH HEAD W." (Q1 or $Q1_{new}$ is referred to herein as the radial positioning value.) After the "A" bursts are written, the actuator is positioned so that the amplitude from the head that writes the widest track is at a value equal to $Q1_{new}$, STEP 74 "POSITION ACTUATOR". At this position, the "B" bursts are written with the head that writes the widest track on the second track. Thereafter, flow continues as described previously.

In another embodiment, the value of Q1 or $Q1_{new}$ is updated every preselected number of tracks, even though the value of Q1 or $Q1_{new}$ is nominally constant for all tracks.

As described further below, the value of Q1 or $Q1_{new}$, which represents a ratio of on-track amplitude, is used to write the servo-pattern. However, referring back to FIG. 2, before the servo-pattern is written, timing marks are generated which indicate circumferentially where the pattern is to be placed, STEP 90 "GENERATE TIMING MARKS." In one example, the timing pattern is comprised of a set of equally spaced radial timing marks of magnetic transitions which are produced in accordance with the principles of the present invention. The timing pattern, as well as the servo-pattern described below, are capable of being written with internal recording heads in a sealed and closed disk drive. No external sensors are needed.

Figure 10:
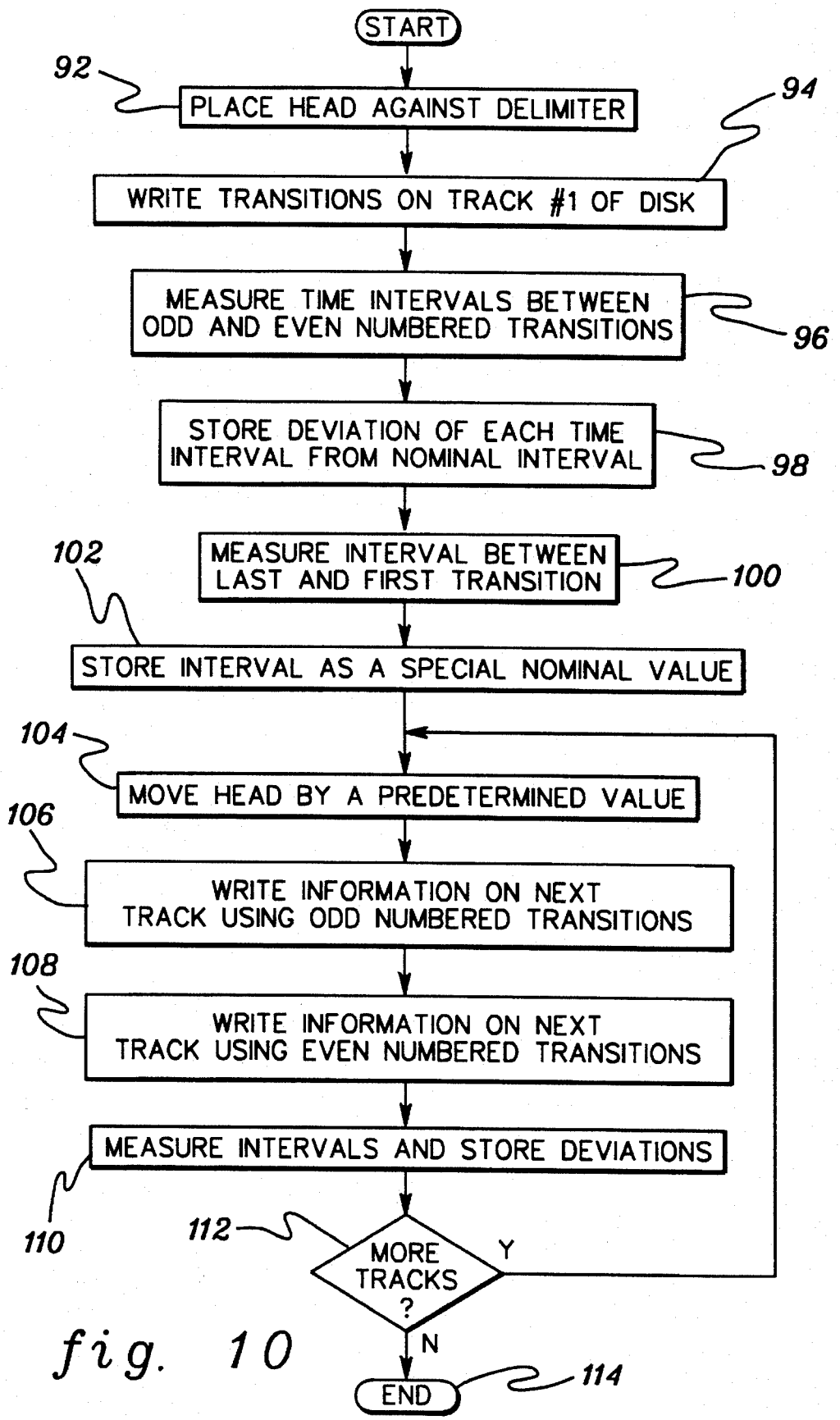
FIG. 10 depicts one embodiment of the logic associated with writing a timing pattern on a disk positioned within the disk drive of FIG. 1, in accordance with the principles of the present invention.

Referring to FIG. 10, one technique for writing a timing pattern on disk 12 is described in detail. In one embodiment, the internal recording head used to write the timing pattern is the head that writes the widest track. Initially, head W is placed against a delimiter (i.e., crash stop 22) at the innermost track location of the disk associated with head W, hereinafter referred to a disk W, STEP 92 "PLACE HEAD AGAINST DELIMITER." With the head at this location, a series of transitions or a series of bursts of transitions (e.g., magnetic transitions) are written on the disk surface at equal time intervals spanning one complete revolution of the disk, STEP 94 "WRITE TRANSITIONS ON TRACK #1 OF DISK." In one example, the disk is rotating at 60 rpm and a time interval of 92.56 microseconds is chosen such that 180 bursts of transitions are written on one track of disk W. These 180 bursts of transitions can be thought of as pairs of transitions, wherein each pair includes an odd numbered transition and an even numbered transition, respectively. For instance, one pair of bursts of transitions includes bursts 1 and 2. Another pair includes bursts 3 and 4, etc.

Subsequent to writing the transitions and, in particular, on the next revolution of disk W, the time interval between each odd and even numbered bursts of transitions (1–2, 3–4, etc.) is measured, STEP 96 "MEASURE TIME INTERVALS BETWEEN ODD AND EVEN NUMBERED TRANSITIONS." In one embodiment, in order to measure the time intervals, time interval measurement system 32 is used. After each of the time intervals is measured, the deviation of each time interval from the nominal interval, e.g., 92.56 microseconds, is determined by using computer 28. In particular, computer 28 subtracts each time interval from the nominal interval in order to obtain the deviations, which are then stored within storage of computer 28, STEP 98 "STORE DEVIATION OF EACH TIME INTERVAL FROM NOMINAL INTERVAL."

In one embodiment, a special nominal value is determined for the time interval between transition 180 and transition 1, STEP 100 "MEASURE INTERVAL BETWEEN LAST AND FIRST TRANSITION." This special nominal interval is created since transition 180 and transition 1 deviate from the nominal interval of 92.56 microseconds by a relatively large amount (i.e., microseconds rather than several nanoseconds). This is due to the fact that transitions 180 and 1 are written 16.67 milliseconds apart rather than 92.56 microseconds apart. After the special nominal value is determined, it is stored in the computer storage for use as the interval between transition 180 and transition 1, STEP 102 "STORE INTERVAL AS A SPECIAL NOMINAL VALUE."

Subsequent to writing the bursts of transitions (or in another embodiment, the series of transitions) on one track and determining and storing the deviations, head W is moved radially off of the first track by a predetermined value, STEP 104 "MOVE HEAD BY A PREDETERMINED VALUE." In one embodiment, the predetermined value is equal to approximately one-half of a track. After moving the head approximately one-half of a track, a new set of even numbered transitions is written by head W using the existing odd numbered transitions as trigger points, STEP 106 "WRITE INFORMATION ON NEXT TRACK USING ODD NUMBERED TRANSITIONS." The time at which a given even numbered transition is written is controlled by programmable delay generator 30 (FIG. 1), which is set equal to the nominal interval plus a fraction, such as one-half, of the stored measured deviation for this pair of transitions. Subsequent to writing the even numbered transitions, a new set of odd numbered transitions are generated, using the even numbered transitions as trigger points, STEP 108 "WRITE INFORMATION ON NEXT TRACK USING EVEN NUMBERED TRANSITIONS." Similar to writing the even numbered transitions, a given odd numbered transition is written at a time controlled by the programmable delay generator. In this case, the delay generator for a given transition pair is set equal to the nominal interval for that pair. In addition to the above, transition 1 is generated from transition 180 and written on the second track. In this case, the programmable delay generator is set to the special nominal value, calculated as described above, plus one-half of the measured deviation located in storage for this pair of transitions. This deviation is zero for the second track, but not for subsequent tracks.

After the even and odd numbered transitions are written, the time interval for each pair of odd-even transitions is measured and each deviation from the nominal time interval (or special nominal interval) is stored within the storage located in computer 28, STEP 110 "MEASURE INTERVALS AND STORE DEVIATIONS."

Thereafter, a determination is made as to whether there are more tracks on the disk to receive timing information, INQUIRY 112 "MORE TRACKS?" Should there be no more tracks on the disk to receive timing information, then the process for placing a timing pattern on a disk surface is complete, STEP 114 "END." However, if the timing pattern is to be written on additional tracks of the disk, then flow returns to STEP 104 "MOVE HEAD BY A PREDETERMINED VALUE," and the process is repeated.

Using the above-described process, equally spaced radial timing marks are provided, which are available for use as trigger points for the generation of a servo-pattern. In one example, the servo-pattern information is written in the regions between the radial timing marks. After the servo-pattern is written, the radial timing marks may be erased. In addition, it is possible to write the servo-pattern without using every radial timing mark.

In accordance with the principles of the present invention, it is desirable to begin the servo-pattern as soon as possible after a radial timing mark in order to minimize timing jitter. The minimum possible time is given by the time required to switch the head from reading to writing, which is typically less than 1 microsecond. Timing jitter between recorded transitions can arise from rotation speed variations, vibrations of the recording head, electronics noise and media noise. (Media noise is typically less than one nanosecond rms for good media and can be ignored in the context of servo-writing). The detailed behavior of jitter depends on the particular mechanical design of a disk, as well as the quality of the disk speed control. As an indication of the magnitude and spectrum of the jitter expected for typical low-end disk drives, the performance of a Hardcard disk drive was measured. An HP5372A time analyzer was used to capture a continuous sequence of 4096 time intervals for a 10 KHz recorded pattern. An inverse of each of the time intervals was taken in order to obtain a record of velocity versus time. Thereafter, the data was organized into individual revolutions and averaged to obtain the repeatable part of the fluctuations. The repeatable part of the fluctuations was subtracted from the data and the non-repeatable velocity fluctuations were obtained by taking a Fourier transform.

Figure 11:
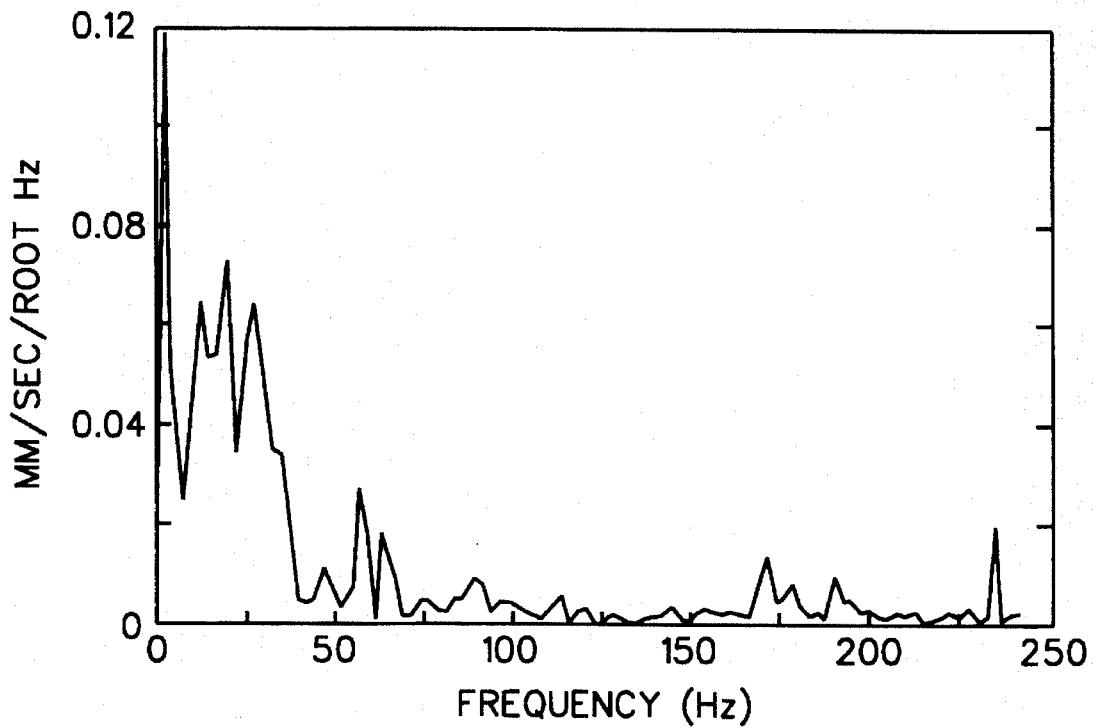
FIG. 11 depicts one example of a plot of the non-repeatable velocity jitter spectral density for a disk drive.

The non-repeatable velocity jitter spectral density for the Hardcard is depicted in FIG. 11. As shown in the graph, most of the fluctuations occur at fairly low frequencies and are probably due to motor speed variation. Several sharp peaks are observed at higher frequencies (1900 and 2800 Hz) and are either suspension resonances or ball bearing defects.

Figure 12:
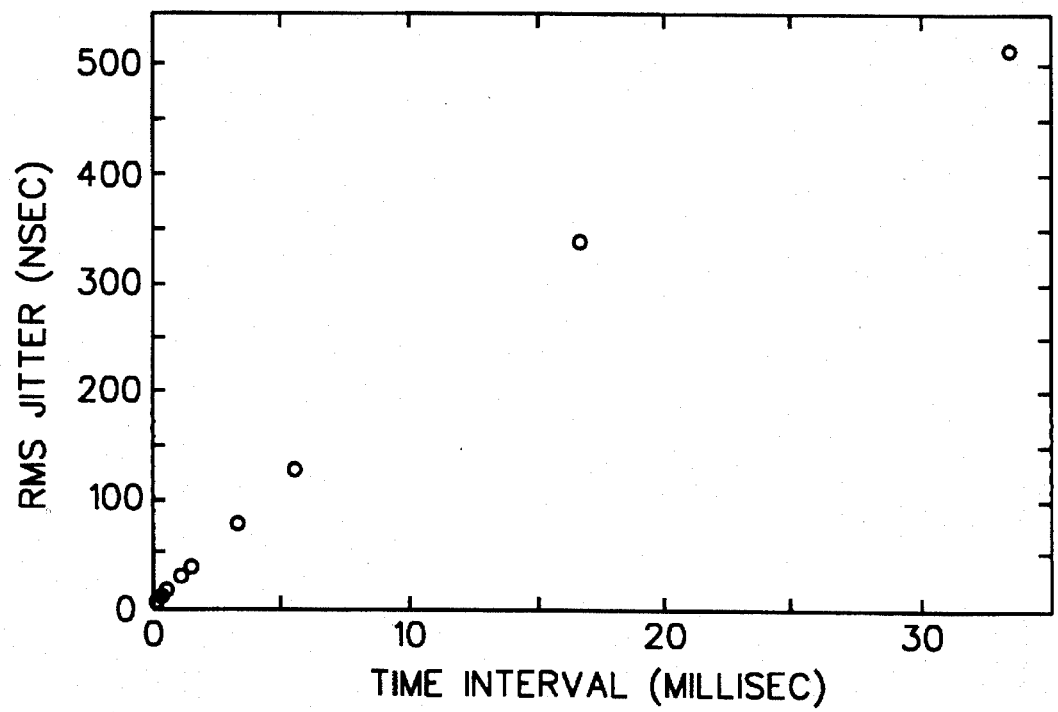
FIG. 12 depicts one example of a plot of the jitter versus time interval for the disk drive of FIG. 11.

Since most of the velocity fluctuation occurs at frequencies below about 30 Hz, the time interval jitter scales linearly with the time interval for times shorter than about 30 milliseconds. This linear relationship is depicted in FIG. 12, which depicts a plot of the rms jitter in nanoseconds versus the time interval in milliseconds obtained by summing groups of intervals in the long sequence record and computing the rms fluctuation of the longer intervals. As one example, for an interval of 92.56 microseconds, the jitter is found to be 4.9 nanoseconds rms. This value is somewhat higher than the linear projection due to electronics noise which, for this particular disk drive, limits the ultimate jitter at zero interval to about 3 nanoseconds. The data generated from the above experiment, demonstrates that servo-pattern information, such as servo-field gray codes or phase bursts, can be lined up within a few nanoseconds by triggering off perfect radial timing mark patterns.

In any self-propagating pattern scheme, this same minimum error applies to every cycle of the process. In general, such processes constitute "random walks" in which the net error grows as the square root of the number of cycles. For a process involving 2000 cycles and an error of 4.9 nanoseconds per cycle, the pattern error will be 219 nanoseconds. Since a typical magnetic pattern period in the gray code or phase burst is about 200 nanoseconds, this error would be totally unacceptable. Using the above-described procedure for writing timing patterns, in accordance to the principles of the present invention, the pattern error along each radial timing mark is equal to about twice the minimum error per cycle, regardless of the number of cycles. (Errors in the absolute location of the radial timing marks do depend on the number of cycles, but the growth is only as the fourth root. These errors do not affect gray code or phase burst placement.) Thus, a 4.9 nanosecond error per cycle would yield about 10 nanoseconds of pattern error, which is only 5% of the magnetic pattern period, an insignificant amount. In addition to the above, a potential improvement in pattern accuracy is provided over existing methods of servo-writing in which timing is provided by a separate clock head or rotation encoder. In such systems, relative physical motion between the clock source and the writing head will result in timing errors. This motion can arise from vibrations of the structures holding the heads or from non-repeatable runout in the spindle. A 3.7 microinch relative motion results in a timing error of 10 nanoseconds for a head at a one inch radius on a disk spinning at 3600 RPM.

As described previously, in writing a timing pattern, in accordance with the principles of the present invention, a timing delay of a predetermined value is used. In one example, the predetermined value is equal to the nominal value plus a fraction, referred to as F, of the measured deviation. In one preferred embodiment the fraction is one-half, based on the comparison of the following three cases:

$F=0$; $F=0.5$; and $F=1$.

Figure 13:
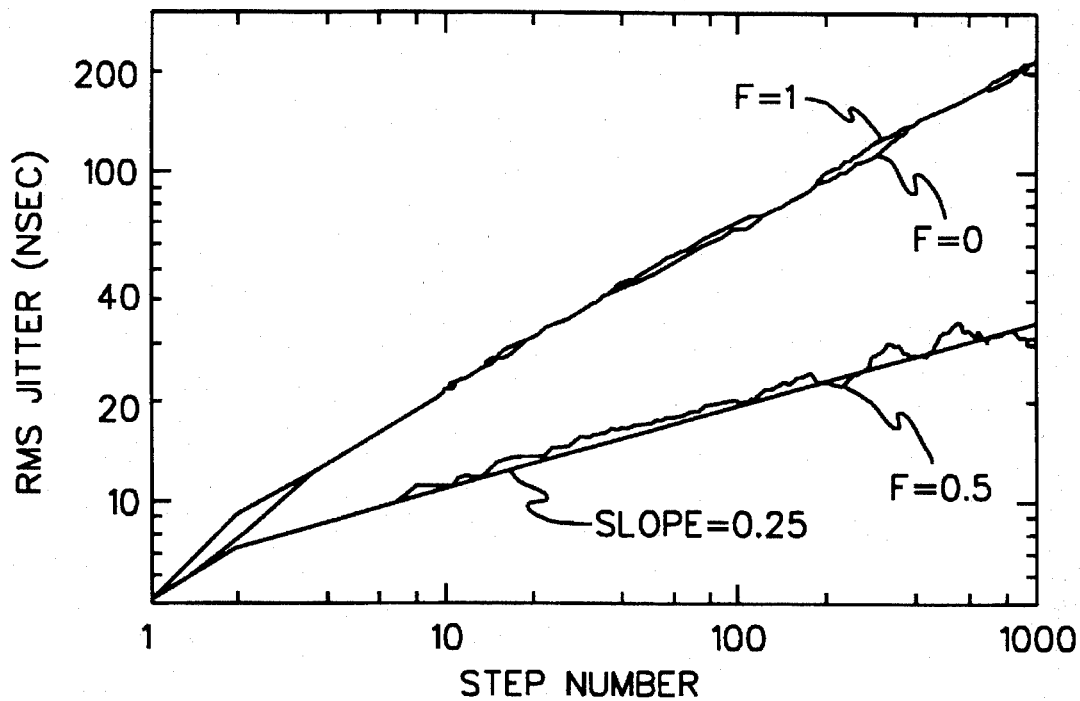
FIG. 13 depicts one example of a plot depicting rms jitter versus step number, in accordance with the principles of the present invention.

Depicted in FIG. 13 is a plot of the rms jitter in the locations of the 180 radial lines around a track versus step number for the three above-mentioned cases. As shown in FIG. 13, there are, for instance, 1000 steps and each step corresponds to a half track. The data depicted in the plot are averages over eight different Monte Carlo runs. (Monte Carlo techniques are computer simulations used for evaluating processes governed by random events and are known to those skilled in the relevant art.) The initial track (e.g., track number one) is generated with errors selected from a Gaussian distribution having a standard deviation of 4.9 nanoseconds to correspond to the measured Hardcard jitter at 92.56 microsecond intervals. The generation of new even numbered transitions involves the addition of errors with a standard deviation of $$4.9 \times \sqrt{1 + F^2}$$

nanoseconds to account for the additional contribution from the measurement process. The generation of odd numbered transitions from even numbered transitions uses 4.9 nanosecond errors. It can be seen from this log-log plot that distinctly different power laws govern the propagation of errors for $F=0$ or 1 and $F=0.5$.

Figure 14A:
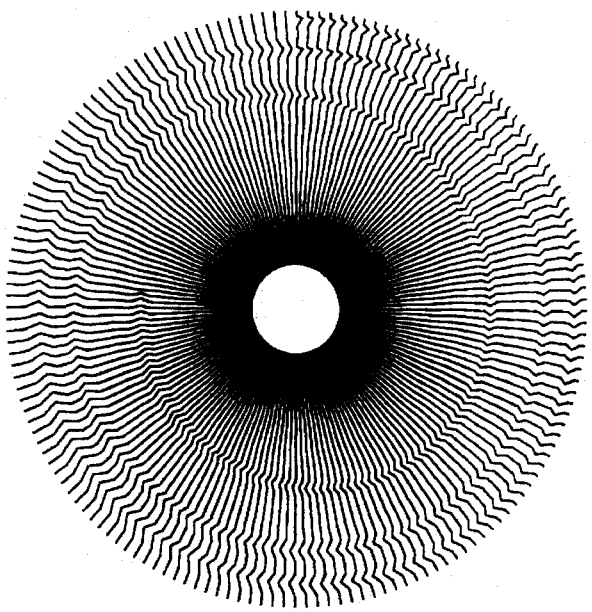
FIG. 14a illustrates a radial timing mark trajectory in which no fraction is added to a nominal time interval in the generation of even numbered transitions from odd numbered transitions, in accordance with the principles of the present invention.
Figure 14B:
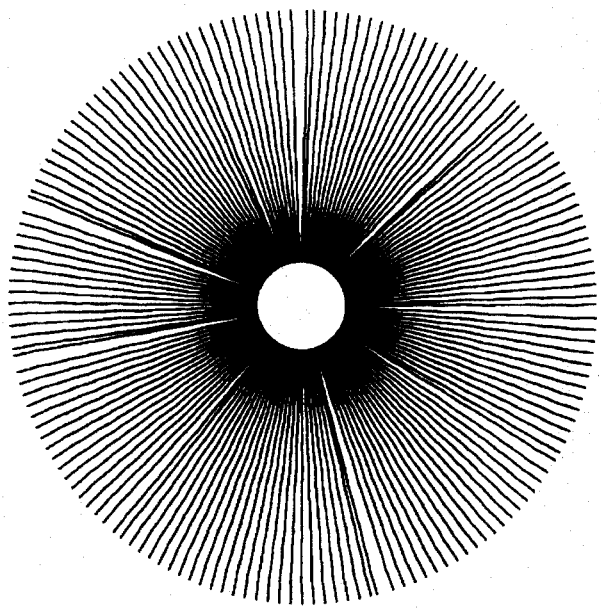
FIG. 14b illustrates a radial timing mark trajectory in which a fraction of 1 is added to a nominal time interval in the generation of even numbered transitions from odd numbered transitions, in accordance with the principles of the present invention.
Figure 14C:
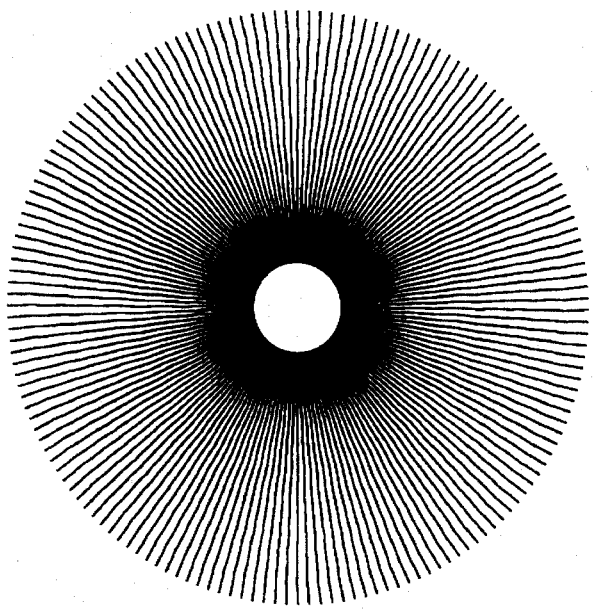
FIG. 14c illustrates a radial timing mark trajectory in which a fraction of ½ is added to a nominal time interval in the generation of even numbered transitions from odd numbered transitions, in accordance with the principles of the present invention.

For the case of $F=0$, there are distinct propagation paths consisting of totally independent random walks that spiral out by moving over two lines azimuthally for each step out (see FIG. 14a). The rms error grows as the square root of the number of steps for such a process. For $F=1$, the errors propagate along independent radial paths and, once again, grow as the square root of the number of steps (FIG. 14b). For $F=0.5$, however, the errors are continuously mixed between the spiral and radial paths (FIG. 14c), resulting in a qualitatively different type of random walk which grows as the fourth root of the number of steps. In FIGS. 14a–14c, the maximum radius corresponds to 200 steps and the angular deviations have been expanded by a factor of 200 to make them visible.

Figure 15:
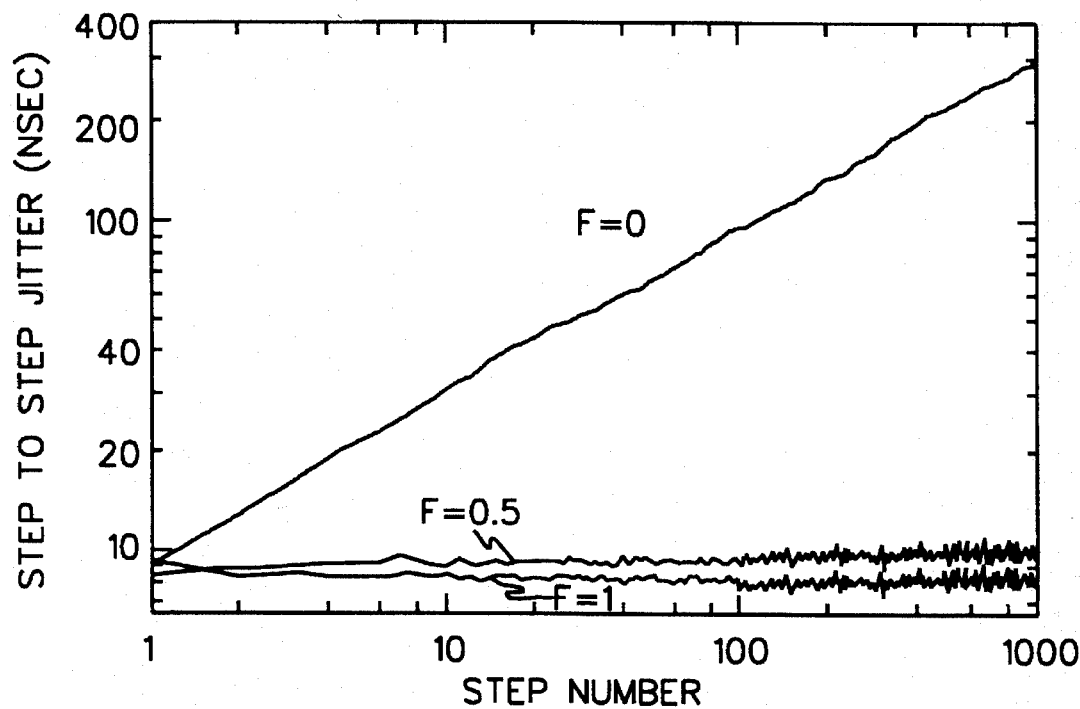
FIG. 15 depicts one example of a plot illustrating error in placement along a radial timing mark versus step number, in accordance with the principles of the present invention.

Timing errors along radial timing marks directly affect the placement of adjacent gray code transitions or phase bursts and, if large enough, will degrade the read-back amplitude of the radial timing marks themselves. Qualitatively, this type of error shows up as a jaggedness of individual lines as depicted in FIGS. 14a–14c. It can be seen that when $F=0$, much larger errors of this type result than when either of the approaches that make use of error measurement and correction (e.g., $F=1$ and $F=0.5$). This is shown quantitatively in FIG. 15 in which the rms error of placement between adjacent steps along a radial timing mark is plotted versus step number. As before, these are averages over eight different runs. For $F=0$, the spiral propagation paths result in step to step errors which are even greater than the absolute location errors around a track. For both $F=1$ and $F=0.5$, the step to step errors are constant (independent of the number of steps) and about equal to twice the basic interval noise of 4.9 nanoseconds.

It should be noted that the overall timing pattern errors are directly proportional to the jitter in the base interval which is used. This can be reduced significantly by improving the motor speed control and by using better read-back signal conditioning. It may also be possible to further reduce the electronic component of the jitter by using bursts of transitions rather than isolated transitions for the radial timing mark pattern. Reduction of the electronics contribution would provide extra improvement by allowing even shorter base intervals between radial timing marks.

The total amount of time required for generating the radial timing mark pattern, in accordance with the principles of the present invention, is estimated to be about two minutes for a pattern consisting of 1000 tracks (2000 steps). This is based on the assumption that each propagation step takes four revolutions to perform; one revolution each for half track head movements, writing even numbered transitions, writing odd numbered transitions, and measuring the odd to even intervals.

It will be apparent to those skilled in the relevant art that a number of variations of the above-described procedure are possible without departing from the spirit of the invention. As one example, an error correction (i.e., the fraction of the measured deviation) other than one-half may be used. As another possibility, a partial error correction in the generation of the odd numbered transitions from the even numbered transitions may be used. During experimentation, this was found to have no effect on the absolute location errors around a track, but does slightly reduce the step to step placement error along the lines.

Described above is a technique for writing clock track information on a surface of a disk using an internal recording head of the disk drive. Referring back to FIG. 2, subsequent to generating the timing pattern, the servo-pattern is written, STEP 120 "WRITE SERVO-PATTERN ON ONE SURFACE."

Figure 16:
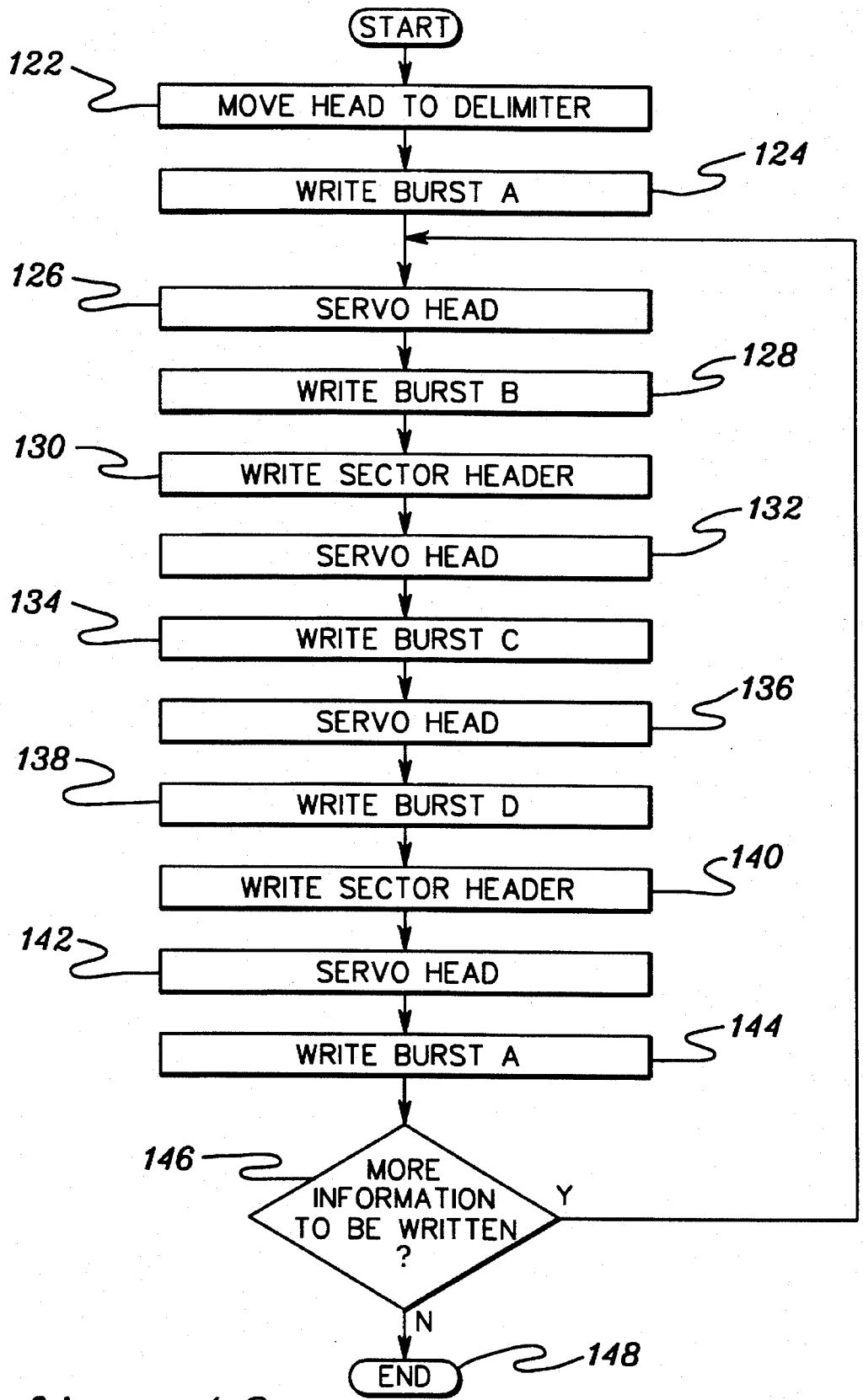
FIG. 16 depicts one example of the logic associated with writing a servo-pattern on one disk surface, in accordance with the principles of the present invention.

Referring to FIG. 16, one technique for writing a servo-pattern using the head that writes the widest track and a fraction of on-track amplitude (i.e., Q1 or $Q1_{new}$) which provides radial positioning of that head, is described in detail. In particular, the head that writes the widest track, head W, is returned to the crash stop at the innermost track of the disk surface associated with head W (i.e., surface W), STEP 122 "MOVE HEAD TO DELIMITER."

At this location, an amplitude burst "A" is written, STEP 124 "WRITE BURST "A"." Triggered on every third timing mark (such as timing mark 1, 4, 7, etc.) an amplitude burst "A" is written with a nominal delay of thirty (30) microseconds and a width of ten (10) microseconds. That is, amplitude burst "A" is written 30 microseconds after the timing mark and for a duration of 10 microseconds. It will be apparent to those of ordinary skill in the art that a burst can be written on every timing mark or at any other desired interval and that every third timing mark is only one example.

Subsequent to writing the "A" bursts after every third timing mark, head W is servoed on the initial "A" burst at a radial position represented by Q1 or $Q1_{new}$, as described above, STEP 126 "SERVO HEAD." With head W at this radial position, an amplitude burst "B" is written at circumferential positions represented by every third timing mark (2, 5, 8, etc.), STEP 128 "WRITE BURST "B"." Each "B" burst is written after every third timing mark with a nominal delay of one (1) microsecond and a width of ten (10) microseconds.

Subsequent to writing the amplitude "A" and "B" bursts, a sector header triggered on every third timing mark (1, 4, 7, etc.) is written, STEP 130 "WRITE SECTOR HEADER." The sector header includes a servo identification field and gray code information, and is written with a nominal delay of one (1) microsecond and a total duration of less than twenty-nine (29) microseconds.

After the sector headers are written, head W is servoed on amplitude burst "B" to the signal level ratio of Q1 or $Q1_{new}$, as determined above, STEP 132 "SERVO HEAD." With head W at this radial position, an amplitude burst "C" triggered on every third timing mark (1, 4, 7, etc.) is written with a nominal delay of forty (40) microseconds and a width of ten (10) microseconds, STEP 134 "WRITE BURST "C"."

Thereafter, head W is servoed on the "C" burst to the signal level ratio of Q1 or $Q1_{new}$, STEP 136 "SERVO HEAD," and an amplitude burst "D" triggered on every third timing mark (2, 5, 8, etc.) is written with a nominal delay of ten (10) microseconds and a width of ten (10) microseconds, STEP 138 "WRITE BURST "D"."

Subsequent to writing bursts "C" and "D" a sector header is written, STEP 140 "WRITE SECTOR HEADER." Similar to writing the sector header in STEP 130, the sector header, including servo identification field and gray code information, is written after every third timing mark (1, 4, 7, etc. ) and is written with a nominal delay of one (1) microsecond and a total duration of less than twenty-nine (29) microseconds.

After writing the sector headers, head W is servoed on the amplitude burst "D" to the signal level ratio of Q1 or $Q1_{new}$, STEP 142 "SERVO HEAD." At this position, burst "A" is written with a nominal delay of thirty (30) microseconds and a width of ten (10) microseconds, STEP 144 "WRITE BURST "A"." As before, the writing of burst "A" is triggered on every third timing mark (1, 4, 7, etc.).

Subsequent to writing the "A" bursts, if it is desired to generate the servo-pattern over more of the entire disk surface, INQUIRY 146 "MORE INFORMATION TO BE WRITTEN?", then flow returns to STEP 126 and the process is repeated. Otherwise, the process of writing the servo-pattern on one disk surface, in accordance with the principles of the present invention, is complete, STEP 148 "END."

At this point, servo-patterns may be generated on any other available disk surfaces, STEP 160 "GENERATE SERVO-PATTERNS ON OTHER SURFACES" (FIG. 2). This is accomplished as described below by using the information from the previously written servo-pattern.

Figure 17:
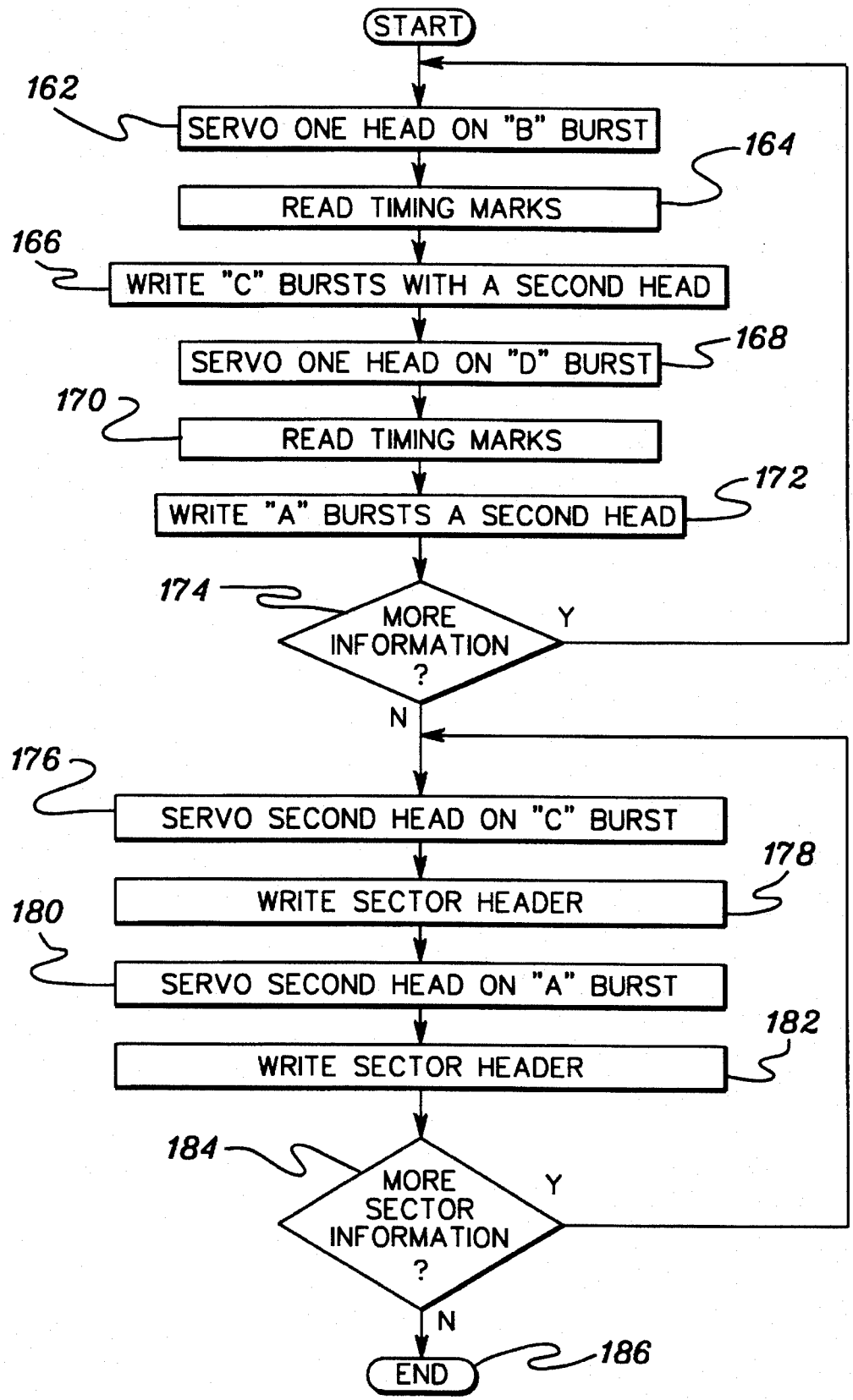
FIG. 17 depicts one example of the logic associated with propagating the servo-pattern of FIG. 16 to other disk surfaces, in accordance with the principles of the present invention.

Referring to FIG. 17, one technique for generating servo-patterns on other disk surfaces is described. Initially, the head that writes the widest track is servoed on the "B" burst of surface W to the signal level of Q1 or $Q1_{new}$, STEP 162 "SERVO ONE HEAD ON "B" BURST." Then, head W reads every third timing mark (i.e., timing mark 1, 4, 7, etc.) on surface W, STEP 164 "READ TIMING MARKS" and triggers the write operation of a second head on a second surface, which can be any head or corresponding surface in the disk drive. The second head writes a "C" burst at a nominal delay of forty (40) microseconds, STEP 166 "WRITE "C" BURSTS WITH A SECOND HEAD."

Subsequently, head W servos on the "D" burst of surface W to the signal level ratio of Q1 or $Q1_{new}$, STEP 168 "SERVO ONE HEAD ON "D" BURST." With head W at this radial position, head W reads every third timing mark (e.g., 1, 4, 7, etc. ) on surface W, STEP 170 "READ TIMING MARKS" and triggers the second head to perform a write operation. The second head writes an amplitude burst "A" on the second surface at a nominal delay of thirty (30) microseconds, STEP 172 "WRITE "A" BURSTS WITH A SECOND HEAD."

After the "A" and "C" bursts are written, if there is more of the servo-pattern on surface W, INQUIRY 174 "MORE INFORMATION?", then flow returns to STEP 162 and the process is repeated. The above is assuming that the servo-pattern consists of the "A" and "C" bursts and not the "B" and "D" bursts, which are only temporary and are used as servo points. The "B" and "D" bursts represent locations where the data tracks will be and, therefore, the "B" and "D" bursts will be overwritten.

When the servo-pattern is generated on an additional surface, then sector header information is placed on the second surface. The second head is servoed on the "C" burst located on the second surface to a signal level ratio of Q1 or $Q1_{new}$, STEP 176 "SERVO SECOND HEAD ON "C" BURST." While servoing at this position, head W is triggered on every third timing mark (e.g., 1, 4, 7, etc.) on surface W and a sector header is written by the second head with a nominal delay of one (1) microsecond and a total duration of less than twenty-nine (29) microseconds, STEP 178 "WRITE SECTOR HEADER."

Thereafter, the second head is servoed on the "A" burst located on the second surface to the signal level ratio of Q1 or $Q1_{new}$, STEP 180 "SERVO SECOND HEAD ON "A" BURST." Head W is once again triggered on every third timing mark (e.g., 1, 4, 7, etc.) on surface W and a sector header is written, STEP 182 "WRITE SECTOR HEADER." As before, the sector header includes a servo-identification field and gray code information and is written with a nominal delay of one (1) microsecond and a total duration of less than twenty-nine (29) microseconds.

Should there be more sector information to be written, INQUIRY 184 "MORE SECTOR INFORMATION?", then flow passes to STEP 176 and the process is repeated. Otherwise, all of the sector information is written and the process of generating a servo-pattern on another disk surface is complete, STEP 186 "END". It will be apparent that the above process can be used to generate the servo-pattern on as many disk surfaces as desired. Referring back to FIG. 2, after the servo-pattern is propagated to other surfaces, the process is complete, STEP 190 "END."

The above-described process results in an amplitude burst servo-pattern written on sixty (60) sectors of a disk surface. If a phase encoded pattern was required, the amplitude bursts would be used for radial information, while the head writes the phase encoded pattern using the timing information available from the timing marks. It will be apparent to one of ordinary skill in the art that the techniques of the present invention can be used to write a servo-pattern with more than two bursts, and that two bursts are only one example.

Figure 18:
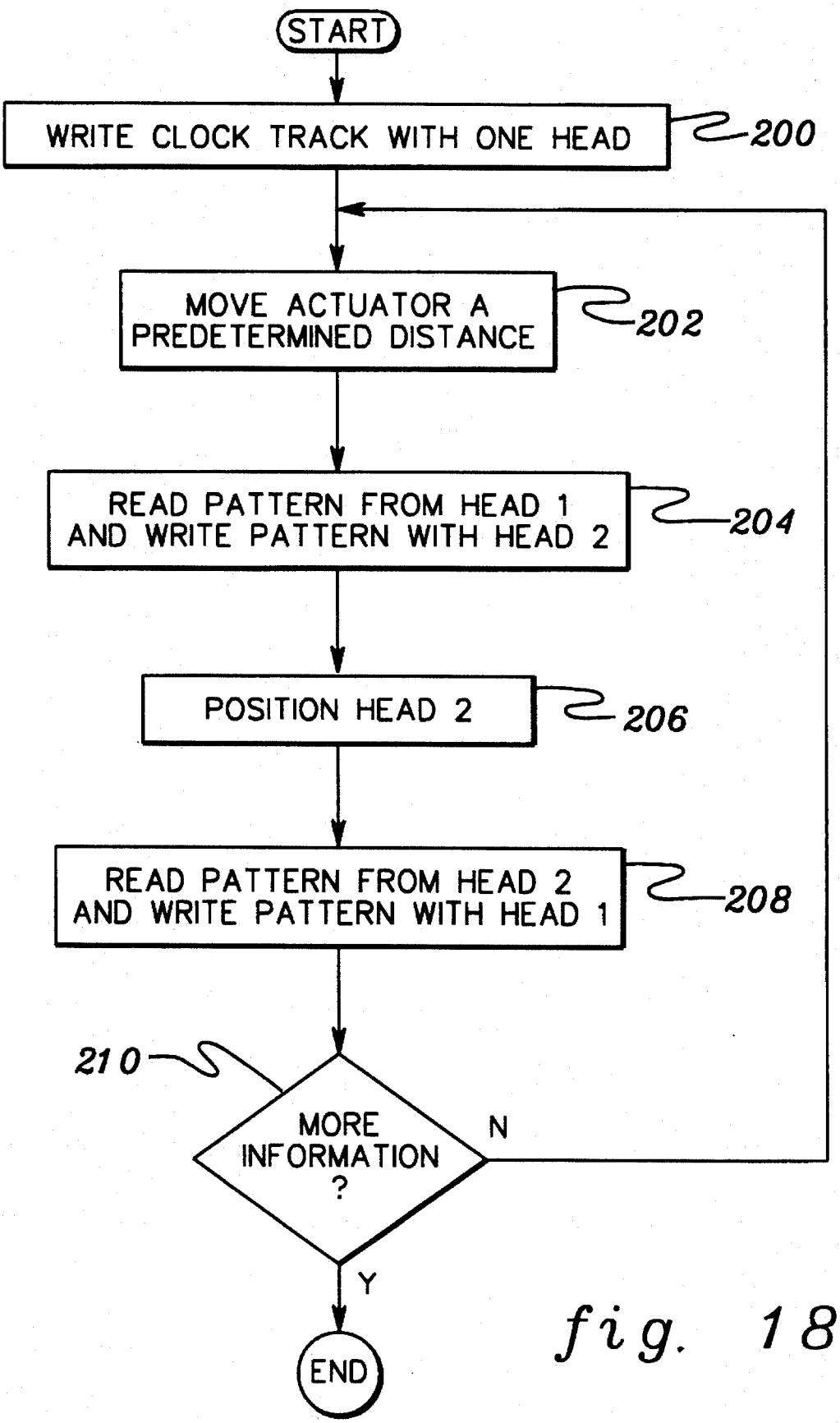
FIG. 18 depicts one embodiment of the logic associated with writing timing information on a disk surface using two heads, in accordance with the principles of the present invention.

Described above is one embodiment for writing a servo-pattern on a disk surface. Described below, with reference to FIG. 2 and FIG. 18, is another embodiment for writing a servo-pattern. Referring to FIG. 2, in this second embodiment, the widest head is determined, as well as the track pitch, in the manner described in detail above. However, the generation of a timing pattern differs from the above process and is described in detail with reference to FIG. 18.

In accordance with the principles of the present invention, in this embodiment, the head selected to write the timing pattern is one of the heads which does not write the widest track. As used herein, the selected head is referred to as head 1, but it should be noted that it can be any head within the disk drive except for that one which writes the widest track. In another embodiment, however, it may be the one that writes the widest track. Referring to FIG. 18, the selected head, head 1, is used to write magnetic transitions representative of a timing pattern on a first track of the disk surface corresponding to head 1. This surface is referred to herein as surface 1, STEP 200 "WRITE CLOCK TRACK WITH ONE HEAD." In one example, the clock track is written onto the disk surface at approximately 2.5 Mhz and a clock track is written at all radial positions on the disk surface.

Subsequent to writing the first clock track with head 1, actuator 18 is moved a predetermined distance, STEP 202 "MOVE ACTUATOR A PREDETERMINED DISTANCE." In one example, the actuator is moved until the amplitude of the read-back signal is roughly one-half of the on-track signal. The actuator is servo-positioned at this one-half amplitude position by sampling the rectified head signal. While the actuator is so positioned, head 1 reads the pattern previously written on the first disk surface and a second head, referred to as head 2, writes a pattern on a second disk surface (surface 2) which is phase-locked to the pattern read by the first head, resulting in a new clock track on a different disk surface, STEP 204 "READ PATTERN FROM HEAD 1 AND WRITE PATTERN WITH HEAD 2." Similar to head 1, head 2 does not necessarily have to be the second head of the disk drive, but can be any head in the disk drive.

Subsequent to writing timing information on the second disk surface, the second head is positioned, STEP 206 "POSITION HEAD 2." In particular, the second head is switched from write mode to read mode and it reads the previously written transition. The signal is converted to an amplitude signal and the actuator is positioned to the amplitude signal level of Q1 or $Q1_{new}$. In this position, the second head reads the clock information on the second surface and a second clock track is written by head 1 on the first disk surface adjacent to the first clock track, STEP 208 "READ PATTERN FROM HEAD 2 AND WRITE PATTERN WITH HEAD 1."

Thereafter, if it is desired to place further clock information on the disk surface, INQUIRY 210 "MORE INFORMATION," flow returns to STEP 202. In one embodiment, it is desired to place timing information on an entire disk surface (i.e., at all radial positions). By repeating the process until an entire disk surface is written with clock tracks, the circumferential position of the head is known at any actuator radial position. The radial positioning accuracy during this process is not that critical as long as the read-back signals are phase locked and add coherently.

Described above is a technique for using two internal recording heads to write a dedicated clock surface. In the example provided, the two recording heads write to different disk surfaces, however, this is not essential. It is possible that the two heads can write to the same surface. One head reads the pattern and the other writes the pattern until a dedicated clock surface is provided by stepping across the disk surface.

Referring to FIG. 2, after the timing information is generated, the servo-pattern is written on one of the disk surfaces using the head that writes the widest track, as described in detail above. Thereafter, the servo-pattern is propagated to all disk surfaces, except the one containing the clock information.

In another embodiment and in accordance with the principles of the present invention, it is also possible to write a servo-pattern on the surface with the clock information. In order to accomplish this, the clock information is written between the radial sector information, on a second surface (i.e., a surface other than the original clock surface). If the radial sectors on the second surface are shifted circumferentially with respect to the first clock surface, the clock information can be available at all theta positions. The clock information on the second surface is used to write the servo-pattern on the original clock surface.

Described above are techniques for writing servo-patterns without using external sensors. Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for generating a timing pattern on a storage medium, said method comprising:

writing a first plurality of transitions at a first radial position on said storage medium;

determining a time interval between selected pairs of said first plurality of transitions;

determining an amount of deviation between each determined time interval and a predetermined nominal interval, such that each selected pair of said first plurality of transitions has a corresponding determined amount of deviation; and writing a second plurality of transitions at a second radial position on said storage medium, each of said second plurality of transitions being written at a corresponding time delay, wherein each of said corresponding time delays comprises said predetermined nominal interval plus a fraction of an amount of deviation related to a pair of said first plurality of transitions, wherein propagation of random errors associated with writing said first plurality of transitions is reduced in writing said second plurality of transitions.

2. A method for writing a servo-pattern on a storage medium located in a recording device having an internal recording head, said method comprising:

generating a timing pattern on said storage medium with said internal recording head, said generating comprising:

writing a first plurality of transitions on a first of a plurality of tracks of said storage medium;

writing a second plurality of transitions on a second of said plurality of tracks of said storage medium, each of a first portion of said second plurality of transitions being written at a corresponding first time delay and each of a second portion of said second plurality of transitions being written at a corresponding second time delay, wherein propagation of random errors associated with writing said first plurality of transitions is reduced in writing said second plurality of transitions;

redetermining said first time delays and said first time delays second time delays, thereby providing redetermined first time delays and redetermined second time delays;

writing another plurality of transitions on another of said plurality of tracks, each of a first portion of said another plurality of transitions being written at a corresponding redetermined first time delay and each of a second portion of said another plurality of transitions being written at a corresponding redetermined second time delay; and repeating said steps of redetermining said redetermined first and second time delays and writing another plurality of transitions, for one or more remaining tracks of said plurality of tracks;

determining a radial positioning value used for radially positioning said internal recording head; and writing a servo-pattern on said storage medium with said internal recording head, said servo-pattern being written at locations determined by said timing pattern and said radial positioning value.

3. The method of claim 2, further comprising the steps of:

determining a time interval between each pair of said first plurality of transitions; and determining an amount of deviation between each determined time interval and a predetermined nominal interval, such that each pair of said first plurality of transitions has a corresponding determined amount of deviation.

4. The method of claim 3, wherein said pair of said plurality of transitions comprises an odd numbered transition and an even numbered transition.

5. The method of claim 3, wherein each of said first time delays is determined based on a function of said predetermined nominal interval and an amount of deviation related to a pair of said first plurality of transitions, and wherein each of said first portion of said second plurality of transitions corresponds to one of said pair of said first plurality of transitions.

6. The method of claim 3, wherein each of said first time delays comprises said predetermined nominal interval plus a fraction of an amount of deviation related to a pair of said first plurality of transitions, and wherein each of said first portion of said second plurality of transitions corresponds to one of said pair of said first plurality of transitions.

7. A method for generating a timing pattern on a storage medium having a plurality of tracks, said method comprising the steps of:

writing a first plurality of transitions at a first radial position on said storage medium;

determining a time interval between selected pairs of said first plurality of transitions;

determining an amount of deviation between each determined time interval and a predetermined nominal interval, such that each selected pair of said first plurality of transitions has a corresponding determined amount of deviation; and writing a second plurality of transitions at a second radial position on said storage medium, said second plurality of transitions comprising a first portion of transition and a second portion of transitions, each of said first portion of transitions corresponding to one of said pair of said first plurality of transitions and each being written at a corresponding first time delay, and each of said second portion of transitions being written at a corresponding second time delay, and wherein said first portion of transitions represents a plurality of even numbered transitions and wherein each of said first time delay comprises said predetermined nominal interval plus a fraction of an amount of deviation related to a pair of said first plurality of transitions, wherein propagation of random errors associated with writing said first plurality of transitions are reduced in writing said second plurality of transitions, whereby random errors in alignment of said second plurality of transitions with respective ones of said first plurality of transitions are reduced.

8. The method of claim 7, wherein a pair of said first plurality of transitions comprises an odd numbered transition and an even numbered transition.

9. The method of claim 8, wherein said second portion of said second plurality of transitions represents a plurality of odd numbered transitions and wherein each of said second time delays comprises predetermined nominal interval.

10. The method of claim 9, wherein said plurality of odd numbered transitions are written using said even numbered transitions written at said first radial position as trigger points.

11. The method of claim 7, wherein said plurality of even numbered transitions are written using odd numbered transitions written at said first radial position as trigger points.

12. A method for writing a servo-pattern on a storage medium located in a recording device having an internal recording head, said method comprising:

generating a timing pattern on said storage medium with said internal recording head, said generating comprising:

writing a first plurality of transitions on a first of a plurality of tracks of said storage medium;

determining a time interval between each pair of said first plurality of transitions;

determining an amount of deviation between each determined time interval and a predetermined nominal interval, such that each pair of said first plurality of transitions has a corresponding determined amount of deviation; and writing a second plurality of transitions on a second of said plurality of tracks of said storage medium, each of a first portion of said second plurality of transitions corresponding to one of said pair of said first plurality of transitions and being written at a corresponding first time delay and each of a second portion of said second plurality of transitions being written at a corresponding second time delay, each of said first time delays comprising said predetermined nominal interval plus a fraction of an amount of deviation related to a pair of said first plurality of transitions, and wherein propagation of random errors associated with writing said first plurality of transitions is reduced in writing said second plurality of transitions;

determining a radial positioning value used for radially positioning said internal recording head; and writing a servo-pattern on said storage medium with said internal recording head, said servo-pattern being written at locations determined by said timing pattern and said radial positioning value.

13. A method for generating a timing pattern on a storage medium, said method comprising:

writing a plurality of transitions at a first radial position on said storage medium;

initially determining a time interval between selected pairs of said plurality of transitions;

initially determining an amount of deviation between each initially determined time interval and a predetermined nominal interval, such that each selected pair of said plurality of transitions has a corresponding initially determined amount of deviation;

writing another plurality of transitions at a second radial position on said storage medium, each of said another plurality of transitions being written at a corresponding time delay following a preceding one of said plurality of transitions, said corresponding time delay being determined by said predetermined nominal interval and a function of said corresponding initially determined amount of deviation, such that propagation of random errors associated with writing said plurality of transitions are reduced in writing said another plurality of transitions, whereby random errors in alignment of said another plurality of transitions with respective ones of said plurality of transitions are reduced;

determining a time interval between selected pairs of said another plurality of transitions;

determining an amount of deviation between each determined time interval and a nominal time interval, such that each selected pair has a corresponding determined deviation amount;

writing another plurality of transitions at another radial position, each of said another plurality of transitions being written at a corresponding time delay determined by said nominal time interval and a function of said corresponding determined deviation amount; and repeating said determining said time interval, determining said amount of deviation and said writing another plurality of transitions at another radial position, for one or more other radial positions.

14. The method of claim 13, wherein said another plurality of transitions written at said second radial position comprises a first portion of transitions, each being written at a corresponding first time delay, and a second portion of transitions, each being written at a corresponding second time delay.

15. The method of claim 14, wherein said first portion of transitions represents a plurality of even numbered transitions and wherein each of said first time delays comprises said predetermined nominal interval plus a fraction of an amount of deviation related to a pair of said plurality of transitions, and wherein each of said first portion of transitions corresponds to one of said pair of said plurality of transitions.

16. The method of claim 14 wherein each of said first time delays is determined based on a function of said predetermined nominal interval and an amount of deviation related to a pair of said plurality of transitions, and wherein each of said first portion of transitions corresponds to one of said pair of said plurality of transitions.

17. A system for generating a timing pattern on a storage medium, said system comprising:

means for writing a first plurality of transitions at a first radial position on said storage medium;

means for determining a time interval between selected pairs of said first plurality of transitions;

means for determining an amount of deviation between each determined time interval and a predetermined nominal interval, such that each selected pair of said first plurality of transitions has a corresponding determined amount of deviation; and means for writing a second plurality of transitions at a second radial position on said storage medium, each of said second plurality of transitions being written at a corresponding time delay, wherein each of said corresponding time delays comprises said predetermined nominal interval plus a fraction of an amount of deviation related to a pair of said first plurality of transitions, wherein propagation of random errors associated with writing said first plurality of transitions is reduced in writing said second plurality of transitions.

18. A system for writing a servo-pattern on a storage medium located in a recording device having an internal recording head, said system comprising:

means for generating a timing pattern on said storage medium with said internal recording head, said means for generating comprising:

means for writing a first plurality of transitions on a first of a plurality of tracks of said storage medium;

means for writing a second plurality of transitions on a second of said plurality of tracks of said storage medium, each of a first portion of said second plurality of transitions being written at a corresponding first time delay and each of a second portion of said second plurality of transitions being written at a corresponding second time delay, wherein propagation of random errors associated with writing said first plurality of transitions is reduced in writing said second plurality of transitions;

means for redetermining said first time delays and said second time delays, thereby providing redetermined first time delays and redetermined second time delays;

means for writing another plurality of transitions on another of said plurality of tracks, each of a first portion of said another plurality of transitions being written at a corresponding redetermined first time delay and each of a second portion of said another plurality of transitions being written at a corresponding redetermined second time delay; and means for repeating said redetermining said redetermined first and second time delays and writing another plurality of transitions, for one or more remaining tracks of said plurality of tracks;

means for determining a radial positioning value used for radially positioning said internal recording head; and means for writing a servo-pattern on said storage medium with said internal recording head, said servo-pattern being written at locations determined by said timing pattern and said radial positioning value.

19. The system of claim 18, further comprising:

means for determining a time interval between each pair of said first plurality of transitions; and means for determining an amount of deviation between each determined time interval and a predetermined nominal interval, such that each pair of said first plurality of transitions has a corresponding determined amount of deviation.

20. The system of claim 19, wherein said pair of said plurality of transitions comprises an odd numbered transition and an even numbered transition.

21. The system of claim 19, wherein each of said first time delays is determined based on a function of said predetermined nominal interval and an amount of deviation related to a pair of said first plurality of transitions, and wherein each of said first portion of said second plurality of transitions corresponds to one of said pair of said first plurality of transitions.

22. The system of claim 19, wherein each of said first time delays comprises said predetermined nominal interval plus a fraction of an amount of deviation related to a pair of said first plurality of transitions, and wherein each of said first portion of said second plurality of transitions corresponds to one of said pair of said first plurality of transitions.

23. A system for generating a timing pattern on a storage medium having a plurality of tracks, said system comprising:

means for writing a first plurality of transitions at a first radial position on said storage medium;

means for determining a time interval between selected pairs of said first plurality of transitions;

means for determining an amount of deviation between each determined time interval and a predetermined nominal interval, such that each selected pair of said first plurality of transitions has a corresponding determined amount of deviation; and means for writing a second plurality of transitions at a second radial position on said storage medium, said second plurality of transitions comprising a first portion of transitions and a second portion of transitions, each of said first portion of transitions corresponding to one of said pair of said first plurality of transitions and each being written at a corresponding first time delay, and each of said second portion of transitions being written at a corresponding second time delay, and wherein said first portion of transitions represents a plurality of even numbered transitions and wherein each of said first time delays comprises said predetermined nominal interval plus a fraction of an amount of deviation related to a pair of said first plurality of transitions, wherein propagation of random errors associated with writing said first plurality of transitions are reduced in writing said second plurality of transitions, whereby random errors in alignment of said second plurality of transitions with respective ones of said first plurality of transitions are reduced.

24. The system of claim 23, wherein a pair of said first plurality of transitions comprises an odd numbered transition and an even numbered transition.

25. The system of claim 24, wherein said second portion of said second plurality of transitions represents a plurality of odd numbered transitions and wherein each of said second time delays comprises a predetermined nominal interval.

26. The system of claim 25, wherein said plurality of odd numbered transitions are written using said even numbered transitions written at said first radial position as trigger points.

27. The system of claim 23, wherein said plurality of even numbered transitions are written using odd numbered transitions written at said first radial positions as trigger points.

28. A system for writing a servo-pattern on a storage medium located in a recording device having an internal recording head, said system comprising:

means for generating a timing pattern on said storage medium with said internal recording head, said means for generating comprising:

means for writing a first plurality of transitions on a first of a plurality of tracks of said storage medium;

means for determining a time interval between each pair of said first plurality of transitions;

means for determining an amount of deviation between each determined time interval and a predetermined nominal interval, such that each pair of said first plurality of transitions has a corresponding determined amount of deviation; and means for writing a second plurality of transitions on a second of said plurality of tracks of said storage medium, each of a first portion of said second plurality of transitions corresponding to one of said pair of said first plurality of transitions and being written at a corresponding first time delay and each of a second portion of said second plurality of transitions being written at a corresponding second time delay, each of said first time delays comprising said predetermined nominal interval plus a fraction of an amount of deviation related to a pair of said first plurality of transitions, and wherein propagation of random errors associated with writing said first plurality of transitions is reduced in writing said second plurality of transitions;

means for determining a radial positioning value used for radially positioning said internal recording head; and means for writing a servo-pattern on said storage medium with said internal recording head, said servo-pattern being written at locations determined by said timing pattern and said radial positioning value.

29. A system for generating a timing pattern on a storage medium, said system comprising:

means for writing a plurality of transitions at a first radial position on said storage medium;

means for initially determining a time interval between selected pairs of said plurality of transitions;

means for initially determining an amount of deviation between each initially determined time interval and a predetermined nominal interval, such that each selected pair of said plurality of transitions has a corresponding initially determined amount of deviation;

means for writing another plurality of transitions at a second radial position on said storage medium, each of said another plurality of transitions being written at a corresponding time delay following a preceding one of said plurality of transitions, said corresponding time delay being determined by said predetermined nominal interval and a function of said corresponding initially determined amount of deviation, such that propagation of random errors associated with writing said plurality of transitions are reduced in writing said another plurality of transitions, whereby random errors in alignment of said another plurality of transitions with respective ones of said plurality of transitions are reduced;

means for determining a time interval between selected pairs of said another plurality of transitions;

means for determining an amount of deviation between each determined time interval and a nominal time interval, such that each selected pair has a corresponding determined deviation amount;

means for writing another plurality of transitions at another radial position, each of said another plurality of transitions being written at a corresponding time delay determined by said nominal time interval and a function of said corresponding determined deviation amount; and means for repeating said determining said time interval, said determining said amount of deviation and said writing another plurality of transitions at another radial position, for one or more other radial positions.

30. The system of claim 29, wherein said another plurality of transitions written at said second radial position comprises a first portion of transitions, each being written at a corresponding first time delay, and a second portion of transitions, each being written at a corresponding second time delay.

31. The system of claim 30, wherein said first portion of transitions represents a plurality of even numbered transitions and wherein each of said first time delays comprises said predetermined nominal interval plus a fraction of an amount of deviation related to a pair of said plurality of transitions, and wherein each of said first portion of transitions corresponds to one of said pair of said plurality of transitions.

32. The system of claim 30, wherein each of said first time delays is determined based on a function of said predetermined nominal interval and an amount of deviation related to a pair of said plurality of transitions, and wherein each of said first portion of transitions corresponds to one of said pair of said plurality of transitions.

* * * * *

UNITED STATES PATENT AND TRADEMARK OFFICE
CERTIFICATE OF CORRECTION

PATENT NO. : 5,615,058
DATED : March 25, 1997
INVENTOR(S) : Chainer et al.

It is certified that error appears in the above-identified patent and that said Letters Patent are hereby corrected as shown below:

Col. 2, line 56, delete "A" and replace with --Each of a--.
Col. 2, line 58, after "and " insert --each of--.
Col. 5, line 25, delete "are written" and replace with --is written--.
Col. 6, line 8, delete "is deter-" and replace with --are deter--.
Col. 6, line 24, delete "surfaces-located" and replace with --surfaces located--.
Col. 17, line 34, delete "and said first time".
Col. 17, line 35, delete "delays second" and replace with --and said second--.
Col. 18, line 26, delete "portion of transition" and replace with --portion of transitions--.
Col. 18, line 35, delete "time delay" and replace with --time delays--.
Col. 22, line 19, delete "positions" and replace with --position--.

Signed and Sealed this

Seventeenth Day of June, 1997

Attest:

*Attesting Officer*

BRUCE LEHMAN

*Commissioner of Patents and Trademarks*